(12) United States Patent
Vercruysse et al.

(10) Patent No.: US 9,607,110 B2
(45) Date of Patent: Mar. 28, 2017

(54) SYSTEM AND METHOD FOR REALIZING A BUILDING SYSTEM

(75) Inventors: Ward A. Vercruysse, Portola Valley, CA (US); Deepak J. Aatresh, Saratoga, CA (US); Zigmund Rubel, Greenbrae, CA (US)

(73) Assignee: ADITAZZ, INC., Brisbane, CA (US)

( * ) Notice: Subject to any disclaimer, the term of this patent is extended or adjusted under 35 U.S.C. 154(b) by 815 days.

(21) Appl. No.: 13/424,233

(22) Filed: Mar. 19, 2012

(65) Prior Publication Data

US 2012/0239353 A1 Sep. 20, 2012

Related U.S. Application Data

(60) Provisional application No. 61/453,867, filed on Mar. 17, 2011.

(51) Int. Cl.
*G06F 17/50* (2006.01)
*G06G 7/48* (2006.01)

(52) U.S. Cl.
CPC ...... *G06F 17/5004* (2013.01); *G06F 2217/02* (2013.01); *G06F 2217/04* (2013.01)

(58) Field of Classification Search
None
See application file for complete search history.

(56) References Cited

U.S. PATENT DOCUMENTS

| | | | |
|---|---|---|---|
| 5,988,862 A * | 11/1999 | Kacyra et al. | 703/6 |
| 6,859,768 B1 | 2/2005 | Wakelam et al. | |
| 7,246,044 B2 | 7/2007 | Imamura et al. | |
| 7,418,666 B2 * | 8/2008 | Cortesi et al. | 715/765 |
| 7,496,487 B2 | 2/2009 | Wakelam et al. | |
| 8,352,218 B2 * | 1/2013 | Balla et al. | 703/1 |
| 8,688,411 B2 * | 4/2014 | Vanker et al. | 703/1 |
| 2001/0047251 A1 * | 11/2001 | Kemp | G06F 17/5004 703/1 |
| 2004/0024624 A1 | 2/2004 | Ciscon et al. | |
| 2008/0015823 A1 * | 1/2008 | Arnold et al. | 703/1 |
| 2008/0077364 A1 | 3/2008 | Wakelam et al. | |
| 2008/0084333 A1 | 4/2008 | Forrest et al. | |
| 2008/0231630 A1 | 9/2008 | Shenkar et al. | |

(Continued)

OTHER PUBLICATIONS

Jun, J. B., S. H. Jacobson, and J. R. Swisher. "Application of discrete-event simulation in health care clinics: A survey." Journal of the operational research society (1999): 109-123.*

(Continued)

*Primary Examiner* — Omar Fernandez Rivas
*Assistant Examiner* — Nithya J Moll

(57) ABSTRACT

A system and method for realizing a building system is disclosed. In an embodiment, a holistic approach to a complex building system involves using high-productivity high-performance computing resources, such as cloud services, to manage a complex building system from building inception through to building operation. Because high-productivity high-performance computing resources are used, modeling, optimization, simulation, and verification can be performed from a single platform on a scale which heretofore has not been applied to complex building systems. Additionally, the holistic approach to complex building systems involves using a centralized database to manage all of the information related to a building system.

20 Claims, 18 Drawing Sheets

(56) References Cited

U.S. PATENT DOCUMENTS

| | | | |
|---|---|---|---|
| 2009/0128558 A1 | 5/2009 | Morello et al. | |
| 2010/0049478 A1 | 2/2010 | Petro | |
| 2010/0070241 A1 | 3/2010 | Opdahl et al. | |
| 2010/0106654 A1 | 4/2010 | Simpson et al. | |
| 2011/0153524 A1 | 6/2011 | Schnackel | |
| 2011/0166710 A1 | 7/2011 | Kordik et al. | |
| 2011/0191069 A1 | 8/2011 | Madsen et al. | |
| 2011/0257942 A1 | 10/2011 | Ankory et al. | |

OTHER PUBLICATIONS

Akin, Omer et al.; "SEED-PRO: Computer Assisted Architectural Programming in SEED"; Journal of Architectural Engineering, vol. 1, No. 4; pp. 1-14; 1995.

Akin, Omer et al.; "Computational Specification of Building Requirements in the Early Stages of Design"; 4th International Conference on Design and Decision Support Systems in Architecture and Urban Planning, Maastricht, The Netherlands, Jul. 26-29; 20 pages; 1998.

Muller, Pascal et al.; "Procedural Modeling of Buildings"; ACM Transactions on Graphics (TOG)—Proceedings of ACM SIGGRAPH 2006; vol. 25 Issue 3; pp. 614-623; 2006.

"Chapter 4: The Building Architectural Design"; Los Alamos National Laboratory Sustainable Design Guide; 32 pgs.; Dec. 2002.

International Search Report and Written Opinion, PCT/US2012/029698, Mar. 19, 2012.

Omer Akin, Ipek Ozkaya; "Models of Design Requirement"; Carnegie Mellon University School of Architecture; Pittsburgh, PA; 2002; p. 1-14.

S.E. Selkowitz, et al.; "A Concept for an Advanced Computer-Based Building Envelope Design Tool"; Presented at the 1986 International Daylighting Conference; Nov. 4-7, 1986; and published in 'Proceedings I', pp. 496-502.

John A. Burns et al.; "White Paper: A Research, Development and Demonstration Agenda for the Development of Computational Methods & Tools for Design, Optimization and Control of Energy Efficient Buildings"; Building Energy Efficiency; DRAFT Version 5; Aug. 5, 2010; p. 1-24.

Aaron G. Cass, Leon J. Osterweil; "Requirements-Based Design Guidance: A Process-Centered Consistency Management Approach"; Department of Computer Science, University of Mass.; p. 1-7.

Magd A. Donia; "Computational Modeling of Design Requirements for Buildings"; School of Architecture and Institute for Complex Engineered Systems, Carnegie Mellon University; p. 1-206.

Changfeng Fu, et al.; "Space-Centred Information Management Approach to Improve CAD-Based Healthcare Guilding Design"; ITcon, vol. 12; 2007; p. 61-71.

Victor Gane et al.; "Design Scenarios: Methodology for Requirements Driven Parametric Modeling of High-Rises"; p. 1-9.

Herm Hofmeyer, et al.; "Improving Design using Autonomous Spatial and Structural Generators"; Session 15: Digital Design Methods—eCAADe 23; p. 743-750.

Ian Howell, et al.; "Building Information Modeling Two Years Later—Huge Potential, Some Success and Several Limitations".

Chris Luebkeman et al.; "CDO: Computational design + optimization in building practice"; The Arup Journal; Mar. 2005; p. 17-21.

Tang-Hung Nguyen et al.; "Automation in Building Design with Spatial Information"; p. 1-6.

K. Papamichael, et al.; "A Computer-Based Building Design Support Environment"; Presented at the First International Symposium on Building Systems Automation-Integration, Madison, WI, Jun. 2-7, 1991.

D.L. Brown, et al.; "Applied & Computational Mathematics Challenges for the Design and Control of Dynamic Energy Systems"; Mar. 17, 2011.

"Building Information Modeling"; from Wikipedia; http://en.widipedia.org/wiki/BuildingInformationModeling.

Thomas C. Schulthess; "High-Performance and High-Productivity Computing (HP2C) Platform"; Swiss National Supercomputing Centre; Mar. 26, 2010; pp. 1-14.

\* cited by examiner

SYSTEM AND METHOD FOR REALIZING A BUILDING SYSTEM

CROSS-REFERENCE TO RELATED APPLICATION

This application is entitled to the benefit of rovisional U.S. Patent Application Ser. No. 61/453,867, filed Mar. 17, 2011, entitled "Method and system to plan, design, construct and deploy buildings," which is incorporated by reference herein.

FIELD OF THE INVENTION

The invention relates generally to buildings, and, more specifically to computer-based techniques for realizing a building system.

BACKGROUND

Buildings are an integral part of our everyday lives. The process of planning, designing and constructing these buildings has evolved over several thousands of years. Today, especially for modern facilities that are places from which to deliver complex services (like healthcare facilities), the steps followed to physically realize such buildings are very complicated and require a high degree of skilled labor that spans several different disciplines.

This complexity poses a huge challenge in terms of time, money and other resources expended in order to build a viable facility that can be used to deliver the intended services in an efficient and profitable way. Several industries and services have met similar complexity challenges by changing their work flow and adapting it to better exploit fast growing and inexpensive computational resources. This has resulted in an increased productivity in those industries.

However, the emergence of technological and computational capabilities has found limited adoption in the well established processes of building design and construction. As a result, there has been little gain in overall productivity, which is desperately needed today to meet the growing demand in complexity. For example, it has been found that while all other non-farming industries have doubled their productivity from 1964 to 2004, the building industry brethren have actually fallen behind.

While a plethora of reasons exist as to why construction productivity has not kept up with other areas, it is possible that conventional methods used in the building design and construction industry are not amenable to applying technology in general and computational technology in particular. Almost all other industries have gained in productivity due to the smart adaptation of computing technology, but, for reasons not immediately apparent, the construction industry has not seen any similar gains.

Buildings come in all different shapes and sizes and the complexity of buildings varies depending on their use. For example, from many different perspectives, a healthcare building such as a hospital is much more complex than an empty warehouse building. The complexity of a building becomes apparent when one tries to mathematically describe, model, simulate, optimize, and verify a building design such as the design of a hospital. In particular, the mathematical description, modeling, simulation, optimization, and verification are each a complex combination of three dimensional (3D) space and temporal operations. Characteristics of the 3D space include, for example, specifics of the building shell and core, the size and layout and function of the rooms, and routing of the building infrastructure. Characteristics of the temporal operations include, for example, the services provided within the building, load on the building (e.g., volume of patients), and dynamic environmental conditions (e.g., internal/external temperature, light, energy cost, etc).

SUMMARY

In accordance with an embodiment of the invention, a holistic approach to a complex building system involves using high-productivity high-performance (HP2) computing resources to manage a complex building system from building inception through to building operation. For example, HP2 computing resources are used to translate a set of customer needs to a complete virtual building design that can be used to construct a building. Further, the information generated during the design of a virtual building can be used as the basis of information that is later used to fabricate, commission, and operate the built version of the virtual building. Because HP2 computing resources are used, modeling, optimization, simulation, and verification can be performed from a single platform on a scale which heretofore has not been applied to complex building systems. Additionally, the holistic approach to complex building systems involves using a centralized database to manage all of the information related to a building system. The centralized database concept is in contrast to the conventional approach where each different discipline (e.g., architects, structural engineers, electrical engineers, etc.) maintains its own proprietary database of discipline-specific information.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements. Additionally, in some cases, reference numbers are not repeated in each figure in order to preserve the clarity and avoid cluttering of the figures.

DETAILED DESCRIPTION

Figure 1:
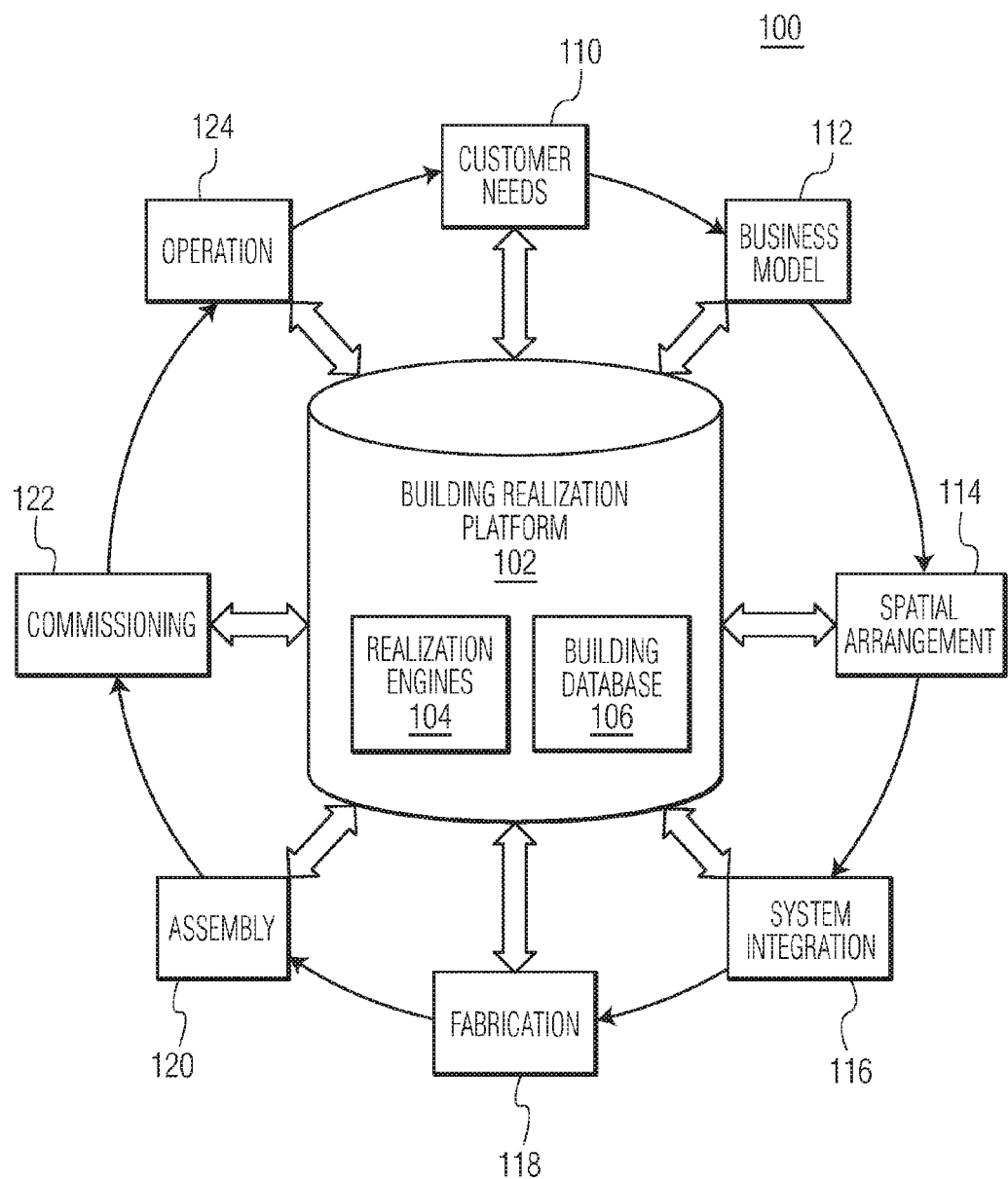
FIG. 1 illustrates a holistic building management system that utilizes high performance and high productivity computing resources to implement a building realization platform that takes a building project from inception to building operation.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Computers have been used to mathematically describe, model, simulate, and optimize buildings. However, conventional computer-based techniques utilize PC-based computer platforms with limited computing capacity to perform very specific operations that are focused on a single issue, e.g., structural performance, temperature modeling, or workflow optimization. Because of the inherent limitations of PC-based computing resources, conventional design, modeling, simulation, and optimization operations are forced to rely on relatively crude mathematical models that can only evaluate a few design options in a reasonable amount of time. Some characteristics that add complexity to a building system are: the system components do not necessarily have mathematically similar structures and may involve different scales in time or space; the number of components may be large, sometimes enormous; components can be connected in a variety of different ways, most often nonlinearly and/or via a network; local and system wide phenomena may depend on each other in complicated ways; the behavior of the overall system can be difficult to predict from the behavior of individual components; and the overall system behavior may evolve along qualitatively different pathways that may display great sensitivity to small perturbations at any stage. Because of the complexity of such building systems, it is difficult if not impossible to comprehensively design, model, simulate, or optimize such building systems on a PC-based computer platform in a manner that will provide significant advances beyond the conventional techniques.

In accordance with an embodiment of the invention, a holistic approach to a complex building system involves using high-productivity high-performance (HP2) computing resources to manage a complex building system from building inception through to building operation. For example, HP2 computing resources are used to translate a set of customer needs to a complete virtual building design that can be used to construct a building. Further, the information generated during the design of a virtual building can be used as the basis of information that is later used to fabricate, commission, and operate a built version of the virtual building. Because HP2 computing resources are used, modeling, optimization, simulation, and verification can be performed from a single platform on a scale which heretofore has not been applied to complex building systems. Additionally, the holistic approach to complex building systems involves using a centralized database to manage all of the information related to a building system. The centralized database concept is in contrast to the conventional approach where each different discipline (e.g., architects, structural engineers, electrical engineers, etc.) maintains its own proprietary database of discipline-specific information.

FIG. 1 illustrates a holistic building management system 100 that utilizes HP2 computing resources to implement a Building Realization Platform (BRP) 102 that takes a building project from inception (e.g., customer needs) to building operation. The BRP is a central hub of building information that can be maintained from the initial specification of customer needs through building operation. In an embodiment, the BRP includes realization engines 104 and a building database 106. In an embodiment, the realization engines include the logic to drive the design, modeling, simulation, optimization, and verification operations related to a building system and the building database includes stored data related to the building system (virtual and/or real) that is designed, modeled, simulated, optimized, and verified by the realization engine.

From a high-level perspective, the BRP 102 supports a series of hierarchical domains that run in a process flow from more abstract to less abstract. The hierarchical domains shown in FIG. 1 are, from more abstract to less abstract, customer needs 110, business model 112, spatial arrangement 114, systems integration 116, fabrication 118, assembly 120, commissioning 122, and operation 124. In the lifecycle of a complex building system, each of the domains is dependent on the data associated with the previous domains. As such, FIG. 1 also illustrates a temporal relationship between the different domains in that certain details of a preceding domain must be specified before the process can move to the next domain. Additionally, the dependencies between domains are tracked to correspond to the requirements of the previous domain.

In an embodiment, the customer needs 110 domain relates to the desired building system from an owner perspective, that is, what is the use of the building system (e.g., healthcare, hospitality, etc.), where the building system will be located, and what are the metrics and their importance to rate the quality of the design. The business model domain 112 relates to the types and volumes of services that will be provided to satisfy the customer needs. The business model may also support behavioral modeling of the building system, and functional and space programs of the building system. The spatial arrangement domain 114 relates to the building system as a set of building structures implementing a desired architectural parti, with relative placed rooms. The systems integration domain 116 relates to a fully detailed facility including defined 3D spaces and building infrastructure from which detailed construction documents can be derived. The fabrication domain 118 relates to how and how many basic elements (i.e., building blocks) need to be fabricated to construct the building system (e.g., a list of building components). The assembly domain 120 relates to how and in which order the basic elements need to be assembled to construct the building system. The commissioning domain 122 relates to the physical building system and its behavior. The commissioning domain may contain information that is similar to the information held in the systems integration domain but also accounts for deviations that might have occurred during the fabrication and assembly of the building system. The operation domain 124 relates to the building system while in operation. In the operation domain, a virtual model of the building system can be used in real time to optimize processes such as room, staff, and patient scheduling, and to evaluate and adapt to unscheduled events.

In an embodiment, each complex building system is designed, modeled, simulated, optimized, and verified from building inception using a pre-defined set of physical building components. The pre-defined set of physical building components may include, for example, structural components, deck components, and wall components. Each of the pre-defined physical building components has a set of known characteristics (e.g., dimensions, materials of construction, structural performance, thermal performance) that can be utilized in the various domains of the BRP to produce more rapid and accurate results. In particular, the use of pre-defined physical building components allows for the development and reuse of mathematical models that enable design, modeling, simulation, optimization, and validation of complex building systems. The pre-defined set of physical building components can be taken into consideration early on in the building design process, for example, within the business model domain, the spatial arrangement domain, and the systems integration domain.

Figure 2:
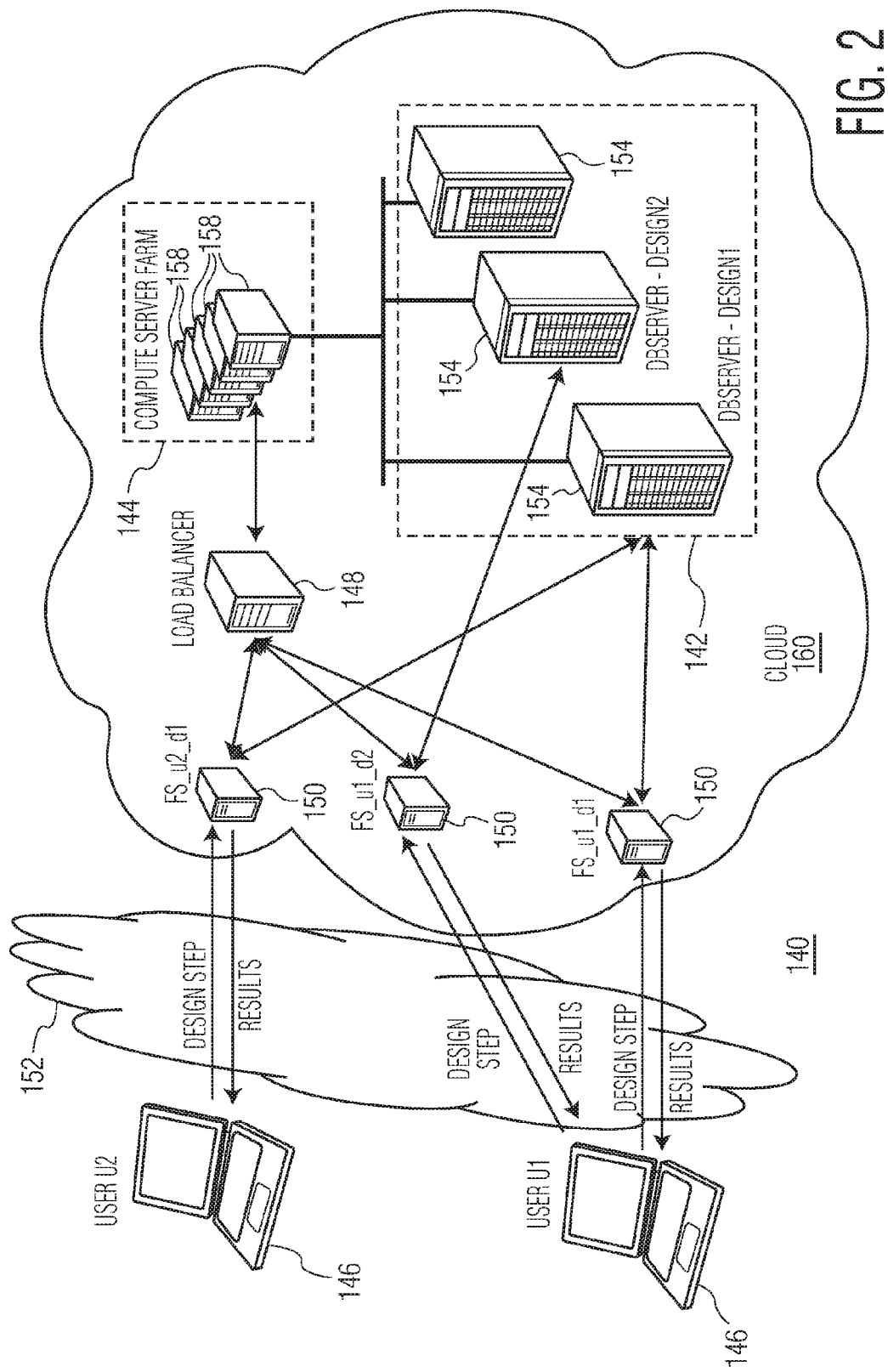
FIG. 2 depicts an embodiment of a high-productivity high-performance computer architecture in which a building realization platform can be implemented.

Performing the processes described with reference to the BRP 102 requires computing resources well beyond what can be provided by typical PC-based computer systems. In an embodiment, the BRP utilizes HP2 computing resources throughout the life cycle of a complex building system. FIG. 2 depicts an embodiment of an HP2 computer architecture 140 in which the BRP can be implemented. In particular, the HP2 computer architecture includes a high capacity networked storage system 142, a large scale processing system 144, and user interface devices 146, e.g., client machines. Additionally, load balancers 148 and flow servers 150 may be provisioned from the large-scale processing system.

The user interface devices 146 may be client machines, typically desktop computers, laptop computers, or tablet computers, on which a session can be opened to control the design flow and to view the performance results of a particular building system design. The user interface devices allow a user to provide design intent and invoke design and analysis steps. Results come in to the user interface devices as they become available. In an embodiment, the user interface devices are used to access a browser-based user interface of the BRP 102 via an access network 152.

The high capacity networked storage system 142 includes memory for storing the software code that is used to implement the realization engine and for storing data related to multiple different complex building systems that are managed using the BRP. In the embodiment of FIG. 2, the high-capacity network storage system includes a networked combination of storage servers 154 that provide storage capacity on the order of Terabits of data.

In contrast to conventional techniques in which each different discipline, e.g., architects, structural engineers, electrical engineers, HVAC engineers, etc., has its own internal proprietary computer networks and a database of building information, the computer architecture depicted in FIG. 2 includes a central repository for data that spans multiple different disciplines related to a complex building system. For example, the data for a specific building may include data related to the customer needs, the business model, spatial arrangement, systems integration, fabrication, assembly, commissioning, and operation. This may include information that crosses many of the disciplines that are conventionally involved in the life cycle of a building. In the embodiment of FIG. 2, the large-capacity storage system 142 includes one or more storage servers that store the building database 106 information and one or more servers that store the computer instructions to implement the realization engines 104.

In an embodiment, the database servers 154 store design information organized as follows: a construction data base, an analysis database, a library of process knowledge, and a library of design rules. The construction database may contain various system descriptions that are independent from how the systems were constructed. The analysis database may contain performance and quality results, obtained through various analyses and simulations of the systems contained in the construction database. The library of process knowledge may contain information related to processes, people patterns, department patterns, building patterns, and mechanical, electrical, and plumbing (MEP)

routing patterns. The library of design rules may contain building codes, such as egress, fire and accessibility requirements, and industry best practices (note that there can be different sets of design rules stored to comply with local variations of building rules). Although an example, of a particular database organization is described, other ways of organizing the data is possible.

The large-scale processing system 144 performs the computer processing that is necessary to implement the BRP. For example, the large-scale processing system performs high-volume mathematical computations to implement the design, modeling, simulation, optimization, and verification of the BRP. In an embodiment, the large scale processing system includes multiple servers 158 (i.e., a server farm or compute farm) that each have many high-speed processors (e.g., on the order of thousands and up), where the individual servers are connected to each other by high-speed network links such as Gigabit Ethernet. Such large scale processing systems can perform on the order of Tera- ($10^{12}$) to Peta- ($10^{15}$) floating point operations per second (Flops), referred to as TFlops and PFlops, respectively. Examples of large scale processing systems include the CRAY XT3, having 3,328 processing cores and the CRAY XT5, having 14,752 processing cores. In an embodiment, the large scale processing system utilizes a grid computing architecture and/or multi-core processors to implement distributed computing according to a "MapReduce" framework. Although examples of the large-scale processing system are described, other large-scale processing systems are possible.

The flow servers 150, which can be virtual, one per user interface device 146 and design, may be compute engines borrowed from the large scale processing system 144 (e.g., server farm), which execute the instructions that implement the BRP design flow. In an embodiment, the flow servers hold the design state of each unique design. That is, the flow servers know the phase of the design cycle for a particular design. Typically, the flow servers hold just enough of the design in memory to allow efficient transfer of design intent, results, and job submission. For computationally intensive tasks, the flow servers submit processing jobs (i.e., computational tasks) to the load balancer 148 and the load balancer distributes the computational tasks based on project, user, and task priorities.

Compute servers 158 of the large-scale processing system 144 are used by the flow servers 150 to perform computational intensive tasks using, for example, map reduced or "MapReduce" techniques for parallel processing. In an embodiment, the compute servers are pooled among flow servers by the load balancer 148. The compute servers can pull large amounts of design information directly from the database servers 154 of the high capacity network storage system 142 and save raw results back to the storage system.

In an embodiment, some or all of the computing resources (excluding the user interface devices) are provided as a "cloud service." For example, the HP2 computing resources of FIG. 2 are provided as a cloud service within a network cloud 160. That is, the computing resources are not owned by the owner or user of the BRP, but are instead utilized and paid for by the owner or user of the BRP on an as needed basis. For example, cloud services such as those provided by Amazon Web Services (AWS) may be utilized to implement the BRP 102.

The HP2 computing architecture 140 depicted in FIG. 2 differs from conventional industry practices in many ways. In particular, the functions of control and presentation are isolated in thin client user interface devices 146, while all compute tasks are performed in a well controlled and high performance cloud service containing both the compute and database servers. The compute machines are not allocated per type of task or discipline (architects, construction engineer, mechanical engineer, operations analyst), but are pooled to serve as flow servers and compute engines. This centralized approach optimizes efficiency in that the flow servers are drawn out of the compute pool as a design session starts and the flow servers coordinate all tasks for that design session. Additionally, the database servers are not organized per discipline, that is, they are not organized separately for each discipline, e.g., one database server each for the architect, the construction engineer, the mechanical engineer, and the operations analyst. In the architecture of FIG. 2, high bandwidth/high volume data transactions occur only between the database servers 154 and the compute servers 158.

Figure 3:
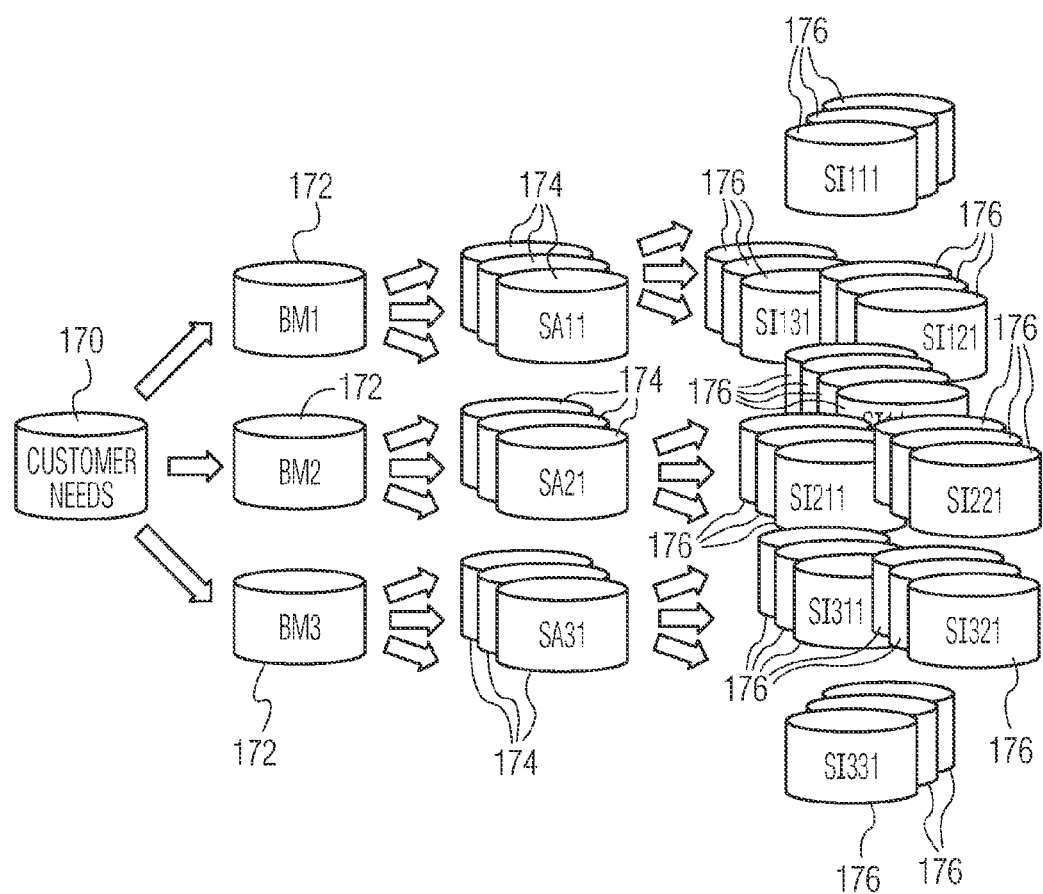
FIG. 3 illustrates an embodiment of a parallel hierarchical design technique that is implemented using the building realization platform.

The BRP 102 and the HP2 computing architecture 140 as described with reference to FIGS. 1 and 2 are utilized in combination to implement a hierarchical parallel design technique, from building inception to a fully defined systems integration, which heretofore has not been envisioned in the field of building design. FIG. 3 illustrates an embodiment of a parallel hierarchical design technique that starts at the customer needs, e.g., building inception, and runs through to a multitude of fully defined systems integrations. Using HP2 computing resources, many different options can be realized and vetted in parallel within each domain from business modeling, to spatial arrangement, to systems integration. At each step in the process, instance-specific data can be stored and maintained for use in subsequent design analysis and/or modification. Additionally, the parallel hierarchical approach allows for the development and tracking of many different design schemes that all relate back to the same set of customer needs. In the embodiment of FIG. 3, a database of customer needs 170 is used to generate a set of different business models, business models databases 172. The database of each different business model is used to generate a set of spatial arrangements, which are stored as spatial arrangement databases 174. The database of each different spatial arrangement is used to generate a set of systems integration designs, which are stored as systems integration design databases 176.

Figure 4:
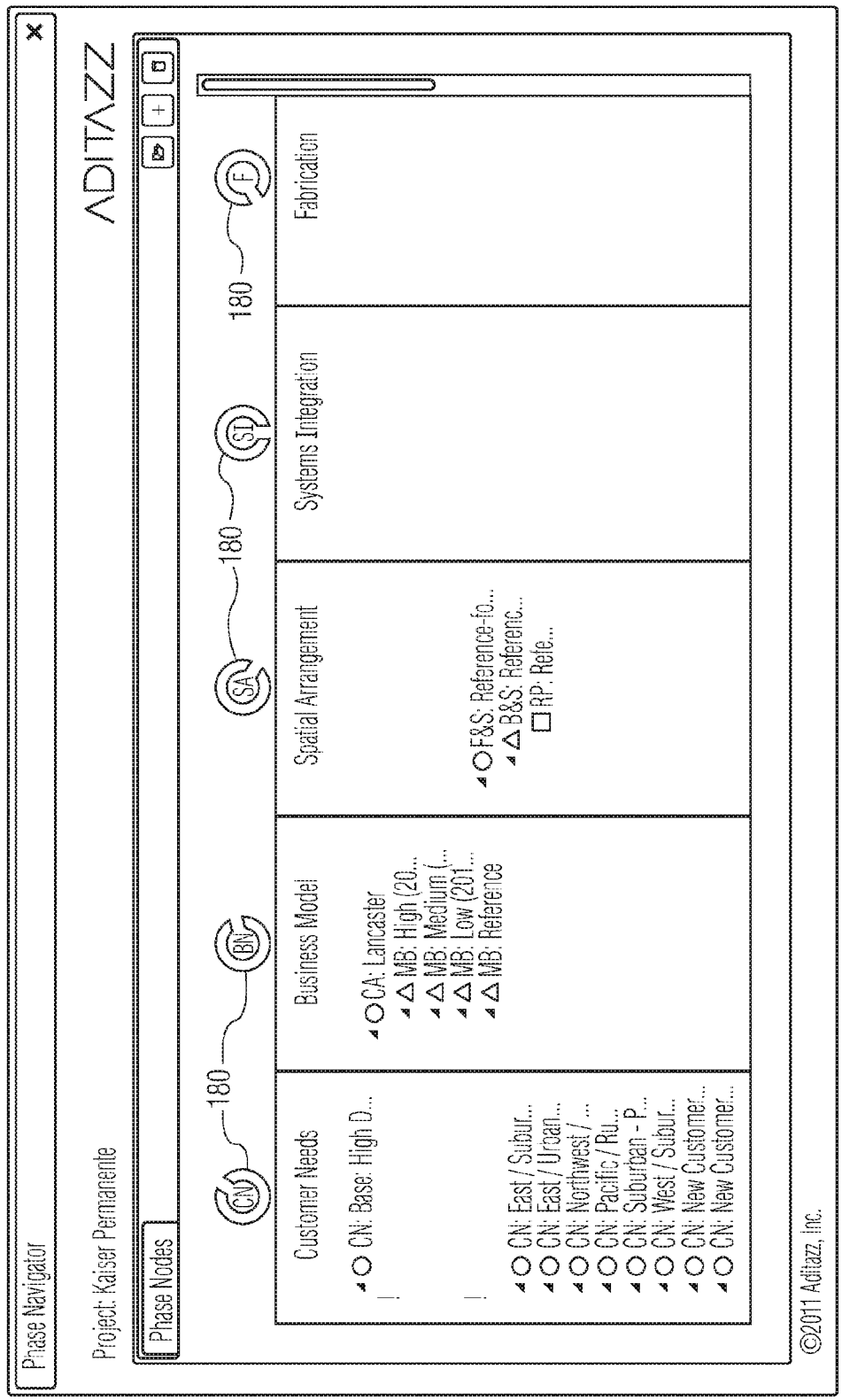
FIG. 4 depicts an embodiment of a user interface of the building realization platform that includes selectable tabs for activating realization engines of the building realization platform.

The parallel hierarchical process illustrated in FIG. 3 is now described in more detail with reference to FIGS. 3-10. FIG. 4 depicts an embodiment of a user interface of the BRP 102 that includes selectable tabs or icons 180 for activating operations in the customer needs domain 110, the business model domain 112, the spatial arrangement domain 114, the systems integration domain 116, and the fabrication domain 118 of the BRP. Within the customer needs domain, customer needs are specified. In an embodiment, customer needs are presented in a web-based user interface at a client device as a formal description of customer needs. For example, the formal description of customer needs is a formal description of information, as known in computer science, which correctly, precisely, and unambiguously represents certain concepts so that the customer needs can be acted upon.

In an embodiment, customer needs are input to the BRP 102 via a client device by an entity that is looking to build a building for a particular use, such as a healthcare facility. For example, the entity or "customer" may specify that it wants to provide enough acute healthcare services to residents within a specific ZIP code to meet anticipated demand. In another embodiment, customer needs may reflect a project location, service objectives, business objectives, and/or a prioritization of customer needs. For example, the customer needs may specify the types of services that will be provided in the building, the volume of services that will be provided in the building, capital investment limitations, return on investment (ROI) requirements, and/or metrics to rate the quality of various design alternatives. Upon being specified, the customer needs are associated with a particular project and stored in the database of the BRP.

In an embodiment, customer needs related to a healthcare building system include a desired location for the building system, a model of care for the building system, and values of the customer. With respect to values, the user interface may allow the user to rate, on a sliding scale, how the user values concepts such as innovation, sustainability, life cycle cost, healthcare improvement, efficiency, and flexibility. In an embodiment, the customer needs domain can provide the user with outputs such as a map of the desired building system location, census data for the desired location, and public health information, such as Centers for Disease Control (CDC) information. In an embodiment, the map may include pointers or "pins" that identify related facilities, e.g., other healthcare facilities, doctors, labs, etc., which are located in the vicinity of the desired location.

The information related to the customer needs can then be stored in the customer needs database 170 of the BRP 102. For example, the project is given a name and the project information including the location, model of care, value ratings, map information, census information, and CDC information is all stored in the BRP's database under the project name. Different projects can be established with different project names and any of the user specific criteria in the customer needs domain can be changed.

With customer needs specified, the process can move to the business model domain 112, were customer needs are used as input and multiple different business models are provided as an output. In the embodiment of FIG. 3, three different business models are provided as an output (BM1, BM2, and BM3), although it should be understood that many more different business models could be generated from the same set of customer needs. In an embodiment, a business model defines the "program" of the building needed to meet the specified customer needs. For example, the business model specifies what types of services will be provided in the building and at what volume the services will be provided. The business model may also specify an initial shell of the building. Therefore, the business model may include both space dimensions and time dimensions.

As illustrated in FIG. 3, multiple different business models can be generated in parallel from the same set of customer needs. In an embodiment, the generation of business models includes a computationally intensive process of design, simulation, optimization, and validation that is able to generate and evaluate a large number of different designs in parallel. For example, it is possible to design, simulate, optimize, and validate on the order of hundreds to thousands of different iterations related to the business models in tens of minutes (e.g., less than one hour) from a single set of customer needs.

In an embodiment, one computationally intensive operation performed in the business model domain 112 involves behavioral simulation to determine the types and volumes of services that should be provided by a particular building. Behavioral simulations are well suited for the study of the processes that underlie formulation and implementation of a business model. For example, behavioral simulations may involve measuring variables at multiple levels, controlling or measuring the context, dealing with historical facts, capturing process differences across issues, and linking processes to outcomes. The behavioral simulations performed in the business model domain are logically linked to the resulting design, construction, and operation of the building.

Throughout the business model domain 112, the BRP 102 tracks dependencies back to the customer needs so that there is a direct relationship between the customer needs and the business models that are generated to meet the customer needs. A change in the customer needs can be propagated to the business model domain and changes can be made to the business model as needed to meet customer needs. Additionally, already generated business models can be evaluated in light of changes to the customer needs. Further, each instance of each different business model is uniquely stored in the database so that each instance can be independently accessed and modified. Unique storage of each instance of a business model allows individual business models to be accessed, evaluated, and/or modified without affecting other business models that correspond to the same set of customer needs.

In an embodiment, the business model identifies the service lines (e.g., emergency care, well care, imaging, laboratory) and/or departments that are to be provided by the building system, the patient load on the building system, and the room and staff needs (e.g., the number and types of rooms and the number and types of staff). The outputs of the business model can be provided to a user via a user interface of the BRP 102.

Figure 5:
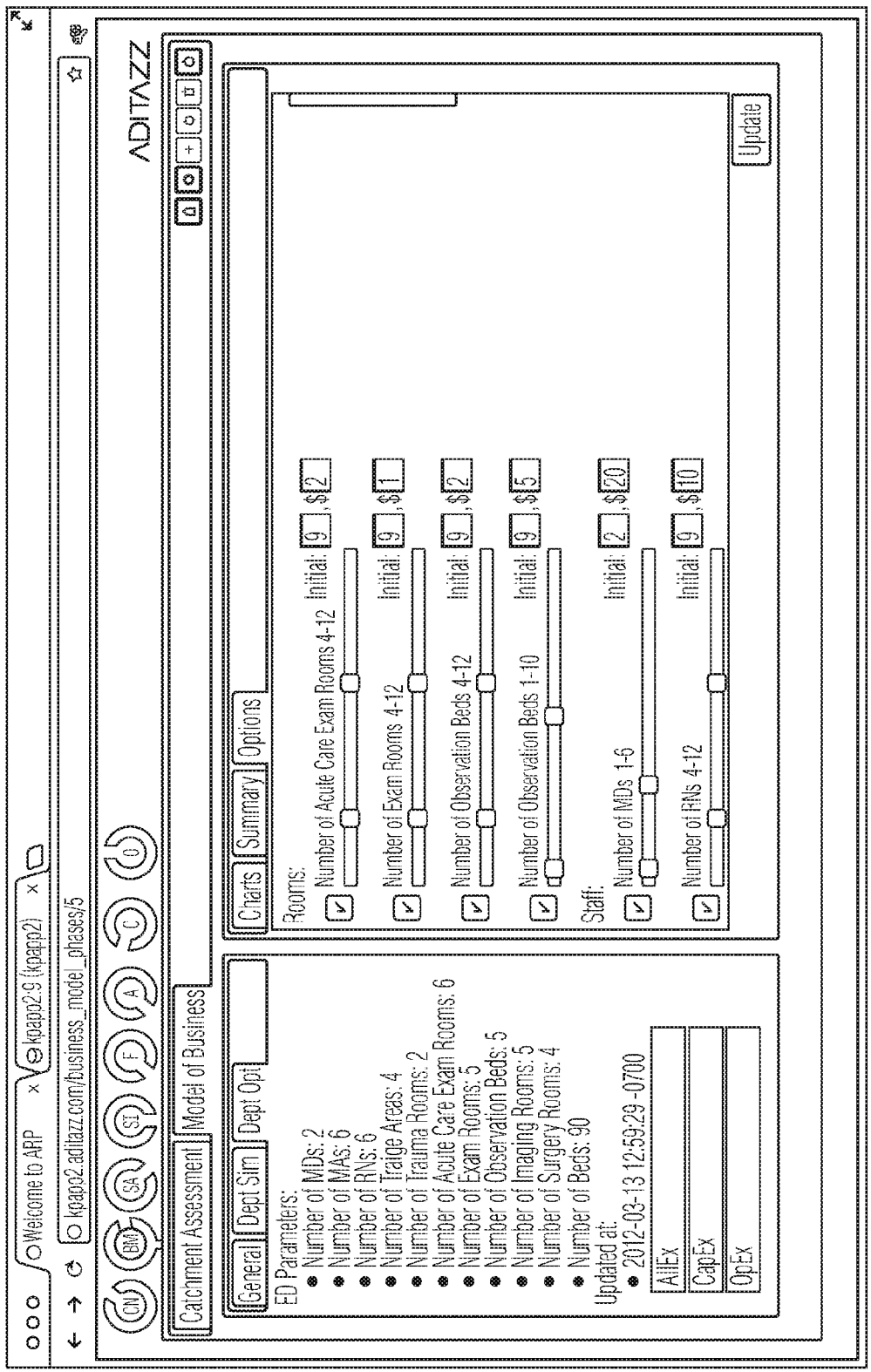
FIG. 5 depicts an embodiment of a user interface from the business model domain of the building realization platform.

FIG. 5 depicts an embodiment of a user interface from the business model domain 112 of the BRP 102. The user interface displays information about the business model such as number of medical doctors (MDs), number of medical assistants (MAs), number of registered nurses (RNs), number of triage areas, number of trauma rooms, number of acute-care exam rooms, number of exam rooms, number of observation beds, number of imaging rooms, number of surgery rooms, and number of beds. Within the business model domain, the behavior of the building system can be simulated based on the criteria of the building model and various workflow logic that is incorporated into the BRP. The user interface of the BRP also enables certain parameters of the business model to be modified for use in simulation. For example, the user interface enables the user to adjust parameters related to any of the business models, such as the number of acute-care exam rooms, the number of exam rooms, the number of observation rooms, the number of trauma rooms, the number of medical doctors, and the number of registered nurses.

Figure 6:
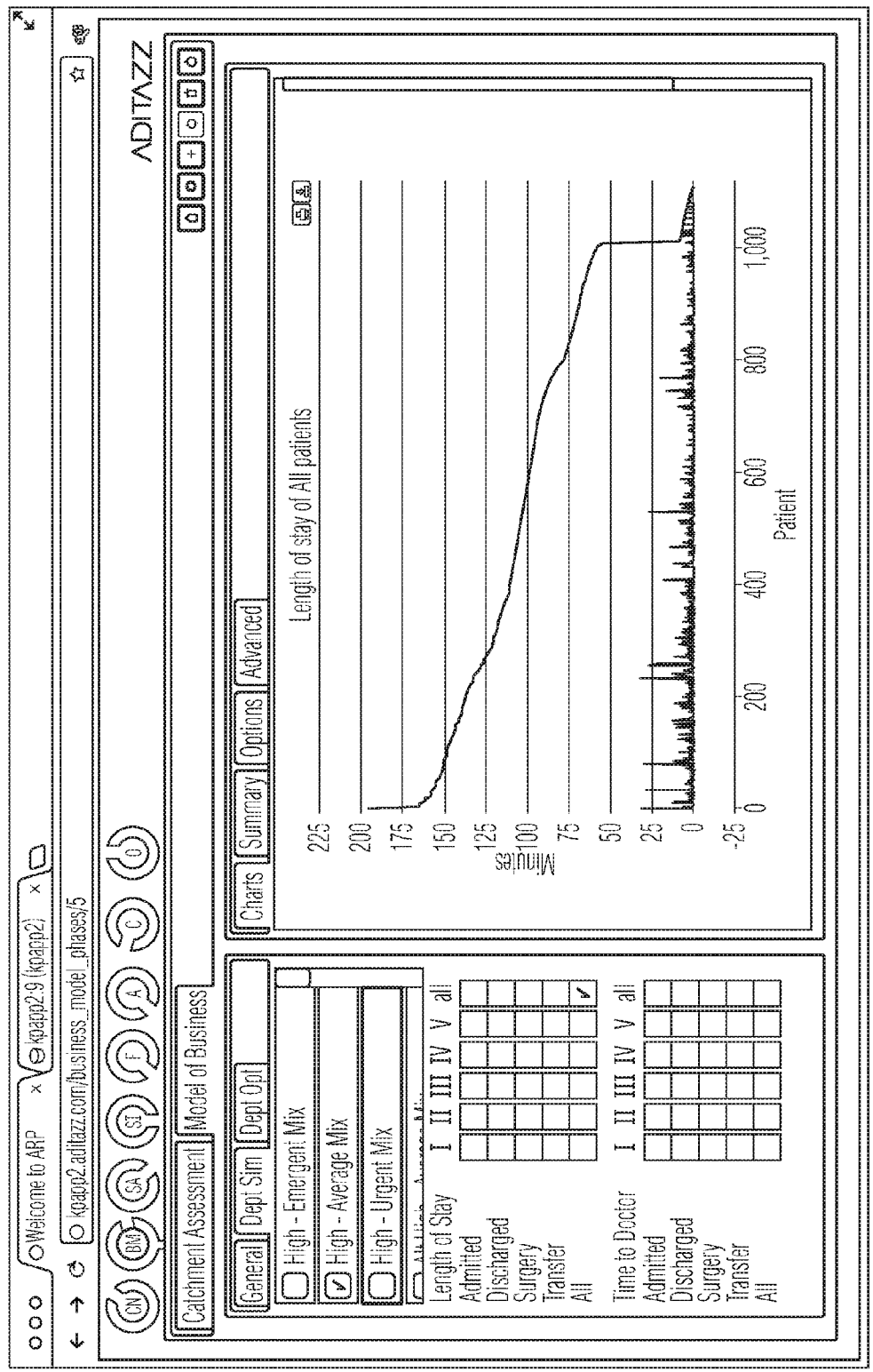
FIG. 6 depicts another embodiment of a user interface from the business model domain of the building realization platform.

FIG. 6 depicts an embodiment of a user interface from the business model domain 112 that shows simulation results generated within the business model domain. For example, the results relate to the length of stay of patients given a certain set of input parameters. In an embodiment, event driven simulations are implemented and the different simulations are set up to use specific HP2 computing resources. For example, each computational operation is mapped to a specific set of processing hardware in the large-scale processing system using MapReduce techniques.

Referring back to FIG. 3, with various different business models specified, the parallel hierarchical process can move to the spatial arrangement domain, where business models are used as input and multiple different spatial arrangements are provided as an output. In the embodiment of FIG. 3, at least three different spatial arrangements are generated for each business model. As shown, spatial arrangements SA11, SA12, and SA13 are generated from BM1, spatial arrangements SA21, SA22, and SA23 are generated from BM2, and spatial arrangements SA31, SA32, and SA33 are generated from BM3. Although three different spatial arrangements are generated from each business module, it should be understood that many more different spatial arrangements could be generated from the same set of business models. In an embodiment, a spatial arrangement defines a building system as a 3D space that includes the basic structure of the building and the placement of rooms. For example, the spatial arrangement defines the approximate square footage of the building, the number of floors in the building, and the number, types, locations, square footage, and functionality of the rooms within the building.

In an embodiment, the spatial arrangements are generated in parallel using the computational resources of the large scale processing system. For example, the computing resources of the large scale processing system are used to design, model, simulate, optimize, and verify the different spatial arrangements.

In an embodiment, processing in the spatial arrangement domain 114 involves the computer assisted placement of departments and/or rooms based on adjacency criteria and behavioral simulation performance. Using computer-assisted placement and HP2 computing resources, many different spatial arrangements can be modeled, simulated, optimized, and verified in a relatively short period of time. For example, an energy efficiency simulation of the building system may involve one thousand separate computational tasks or jobs that each require one hour to complete. Using HP2 computing resources, the one thousand separate computational tasks can be processed in parallel by separate processors (e.g., separate physical hardware devices), reducing the time required to complete the entire task by roughly one thousand fold.

Within the spatial arrangement domain 114, the BRP 102 tracks dependencies back to the corresponding business models so that there is a direct relationship between the spatial arrangements, the building models, and ultimately the customer needs. A change in the customer needs or business model domains can be propagated to the spatial arrangement domain and changes can be made to the spatial arrangements as necessary. Further, each instance of each different spatial arrangement can be uniquely stored in the database so that each instance can be independently accessed and manipulated. Because the business models and spatial arrangements are maintained in hierarchical order, only changes that affect a particular hierarchical chain need to be propagated to the spatial arrangements. For example, if a change is made to an aspect of BM1 only, the change can be propagated to the spatial arrangements, SA11, SA12, and SA13 only, while the spatial arrangements that are linked to BM2 and BM3 (e.g., SA21, SA22, SA23, and SA31, SA32, SA33, respectively) are not affected.

Figure 7:
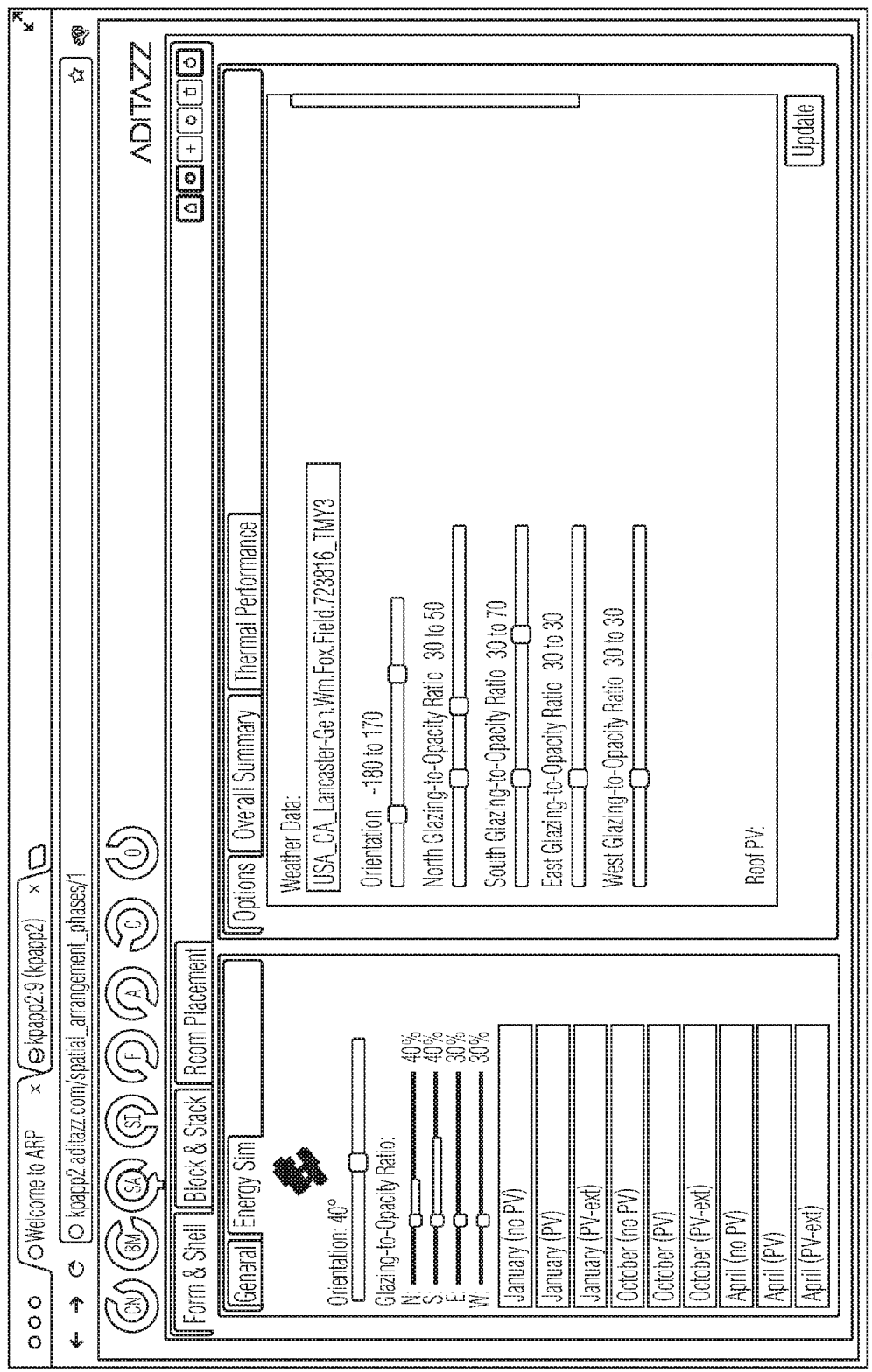
FIG. 7 depicts an embodiment of a user interface from the form and shell tab in the spatial arrangement domain of the building realization platform.

In an embodiment, a spatial arrangement specifies aspects of the building system related to "form and shell," "block and stack," and "room placement." In an embodiment, the form and shell within the spatial arrangement domain 114 specifies parameters such as the shape (e.g., architectural pattern or architectural parti) and dimensions of the building system. The form and shell may also specify the orientation and location of the building on the site specified in the customer needs. From the specified form and shell, various models, simulations, and/or optimizations can be performed using the HP2 computing resources. For example, using the HP2 computing resources, energy efficiency simulations and optimization operations can be performed on a scale that heretofore has not been possible. FIG. 7 depicts an embodiment of a user interface from the form and shell tab in the spatial arrangement domain that shows adjustable parameters of an energy efficiency simulation that is implemented at the form and shell level. Adjustable parameters for the simulation include the time of year (e.g., month), the orientation of the building, and glazing-to-opacity ratios in different directions, e.g., east, west, north, south.

Figure 8:
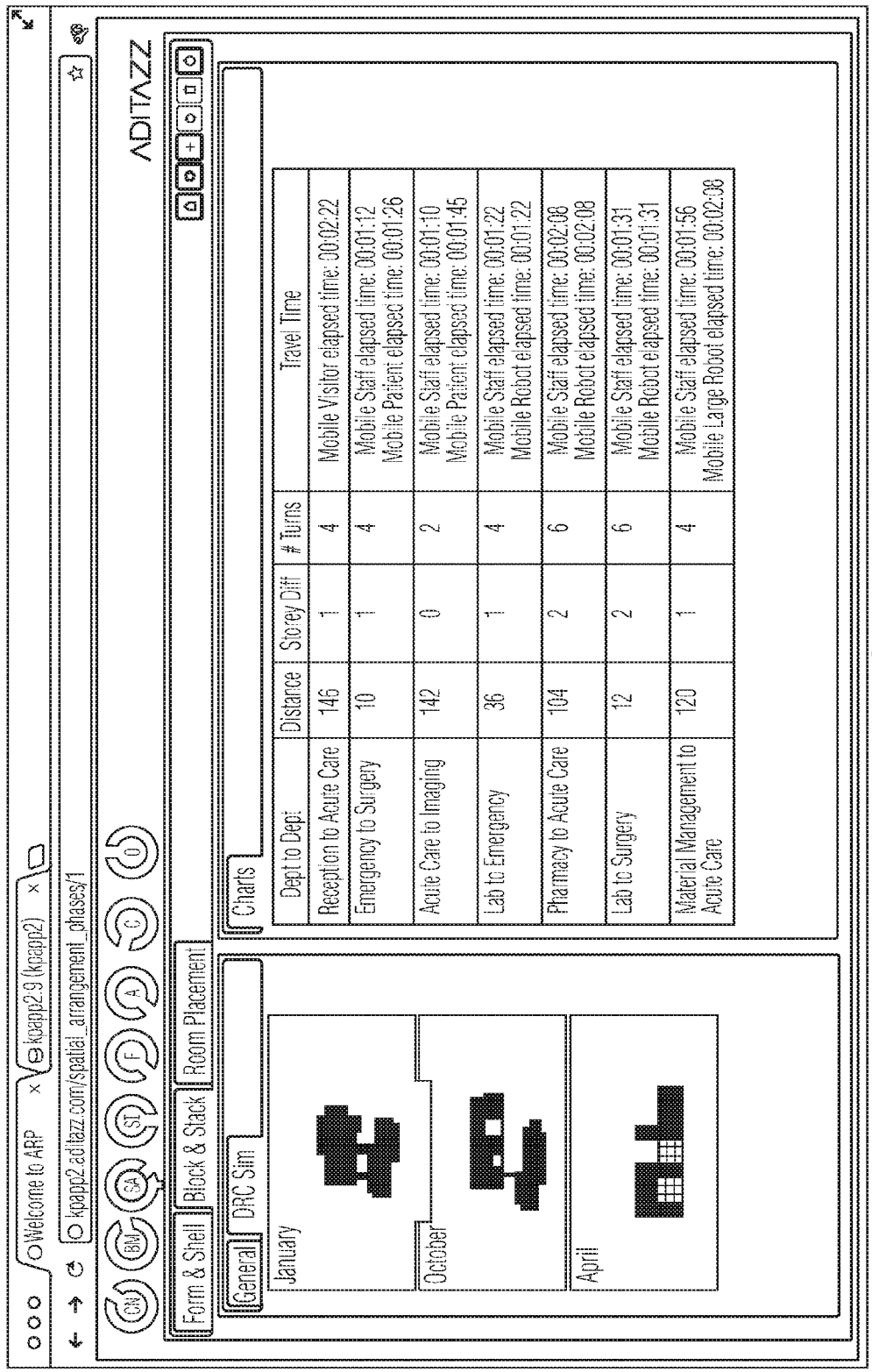
FIG. 8 depicts an embodiment of a user interface from the block and stack tab of the spatial arrangement domain of the building realization platform.

In an embodiment, block and stack within the spatial arrangement domain 114 specifies how departmental blocks and circulation elements are placed within the specified form and shell of the building system. For example, the block and stack defines how departmental blocks are configured relative to each other in the horizontal direction and how departmental blocks are configured, or "stacked," relative to each other in the vertical direction (e.g., between different floors of a multistory building). From the specified block and stack, various models, simulations, and/or optimizations can be performed using the HP2 computing resources. For example, operations may include interactive departmental distance exploration, behavioral simulation with department distances, and generation of individual departmental blocks. FIG. 8 depicts an embodiment of a user interface from the block and stack tab of the spatial arrangement domain that shows the output of a simulation to determine travel distances and times between certain departments given a particular block and stack.

Figure 9:
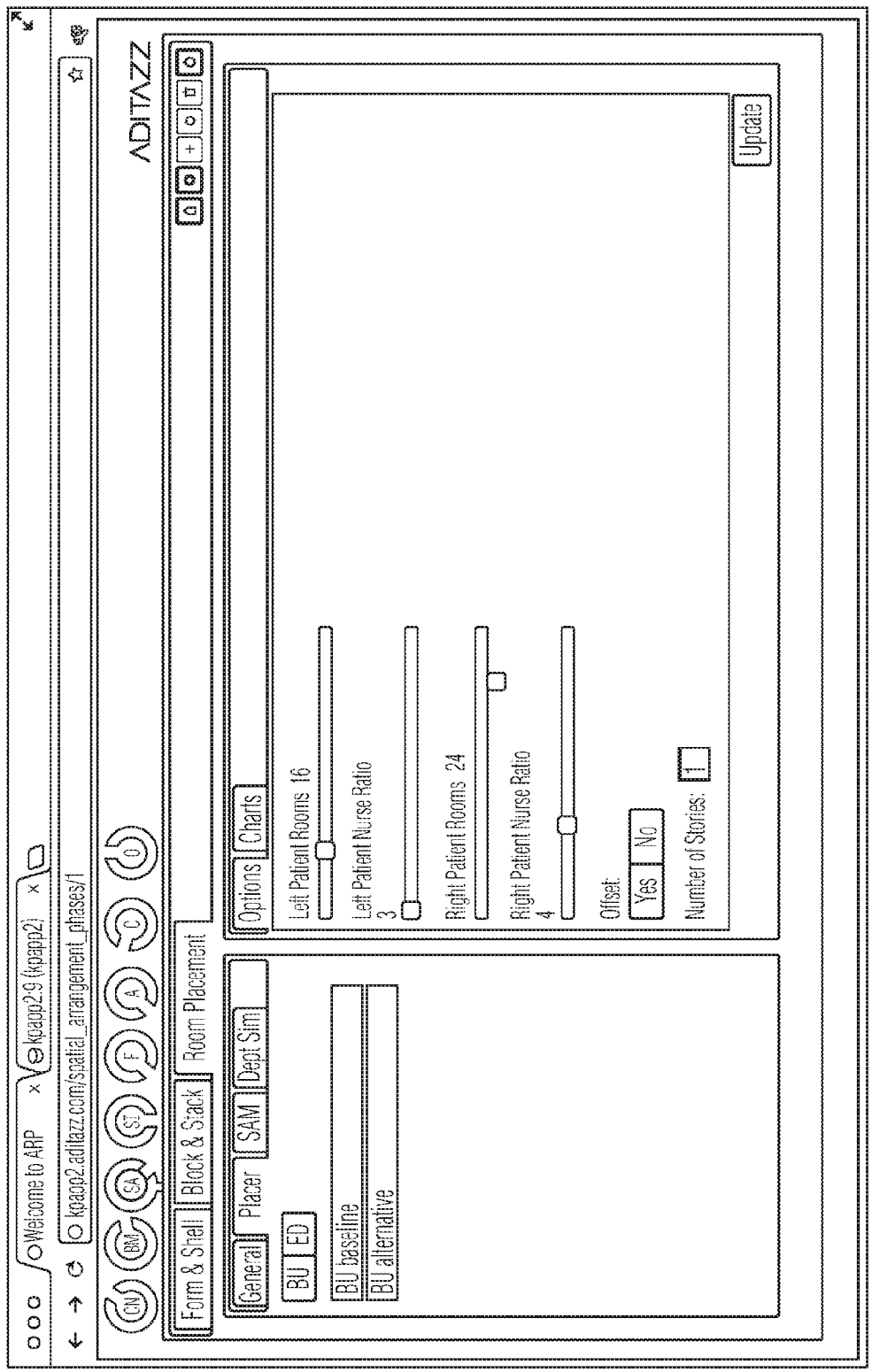
FIGS. 9 and 10 depict user interfaces from the room placement tab of the spatial arrangement domain of the building realization platform.
Figure 10:
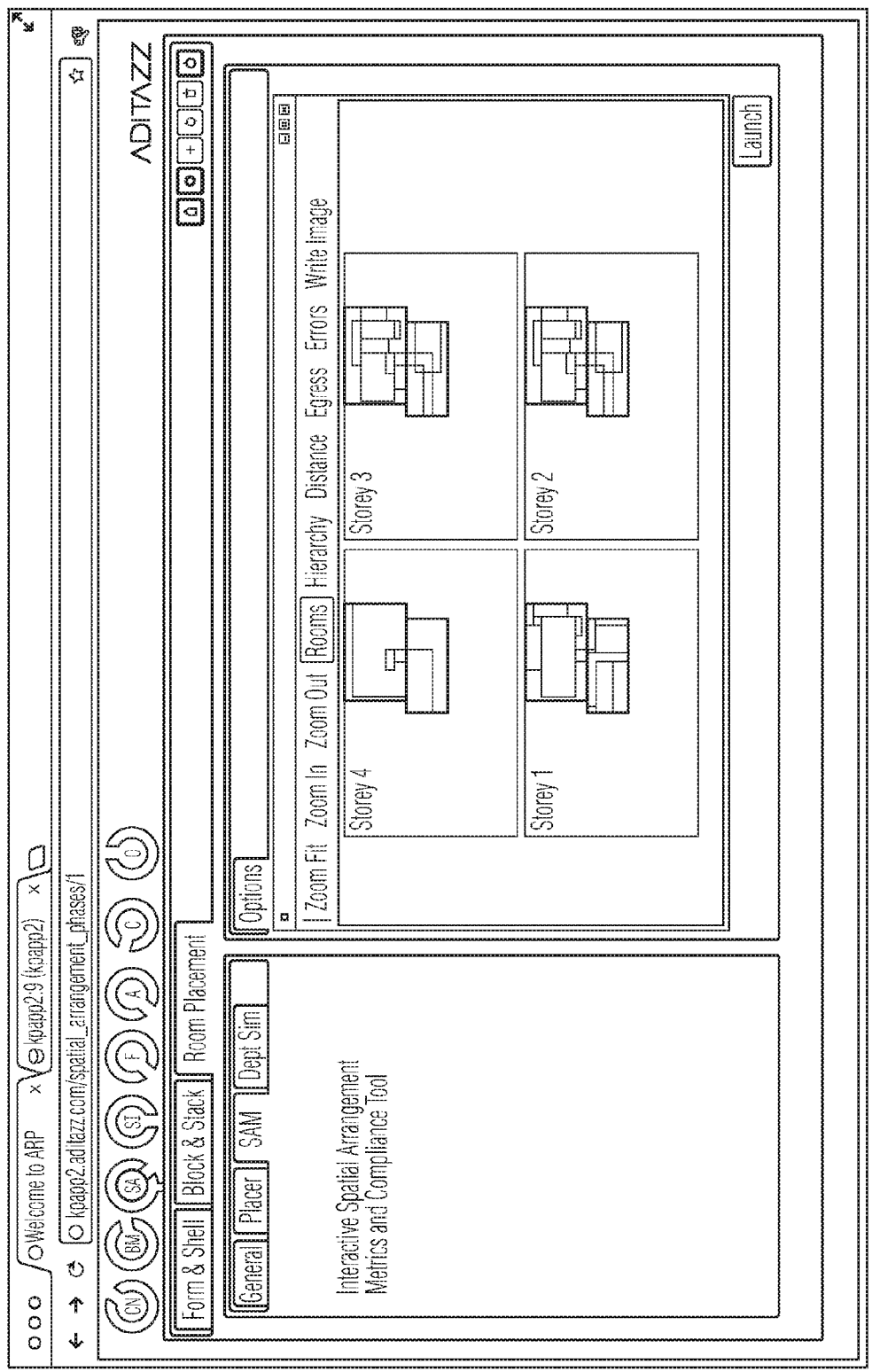

In an embodiment, room placement within the spatial arrangement domain 114 specifies the locations of specific rooms within a building system having a specific block and stack arrangement. From the specified room placement, various models, simulations, and/or optimizations can be performed using the HP2 computing resources. For example, operations may include interactive room distance exploration, behavioral simulation with room distances, and egress design rule checking FIGS. 9 and 10 depict user interfaces from the room placement tab of the spatial arrangement domain. In particular, FIG. 9 depicts certain adjustable criteria for room placement and FIG. 10 depicts different room placement designs that are generated based on a given set of criteria.

Referring back to FIG. 3, with various different spatial arrangements generated and stored, the process can move to the systems integration domain, where spatial arrangements are used as input and multiple different systems integration designs are provided as an output. In an embodiment, a systems integration design defines the 3D spaces of a building and the infrastructure of the building. For example, the systems integration design for a building defines the locations in three dimensions (i.e., "3D spaces) of the infrastructure elements of the building system. The building infrastructure specified in the systems integration design may include, for example, the location and specifications of mechanical, electrical, and plumbing (MEP) systems, information technology (IT), safety and security elements, and lighting. In the systems integration designs, the locations of the building infrastructure elements are fully defined and integrated into the 3D spaces of the building system. In an embodiment, the systems integration designs are generated in parallel using the computational resources of the large scale processing system to design, model, simulate, optimize, and verify the different systems integration designs.

In the embodiment of FIG. 3, at least three different systems integrations are generated for each spatial arrangement. As shown, systems integration designs SI111, SI112, SI113 are generated for spatial arrangement SA11, systems integration designs SI121, SI122, and SI123 are generated for spatial arrangement SA12, systems integration designs SI131, SI132, and SI133 are generated for spatial arrangement SA13, and so on for a total of twenty-seven different systems integration designs. Although three different systems integration designs are generated for each spatial arrangement, it should be understood that many more different systems integration designs could be generated from the same set of spatial arrangements. As illustrated in FIG. 3, a large number of design options can be generated from the same set of customer needs. Further, the computational task of designing, modeling, simulating, optimizing, and verifying all of the different design options can grow to be quite large quite fast. Hence, the use of HP2 computing resources along with a centralized BRP 102 is key to enabling the parallel hierarchical design technique.

Figure 11:
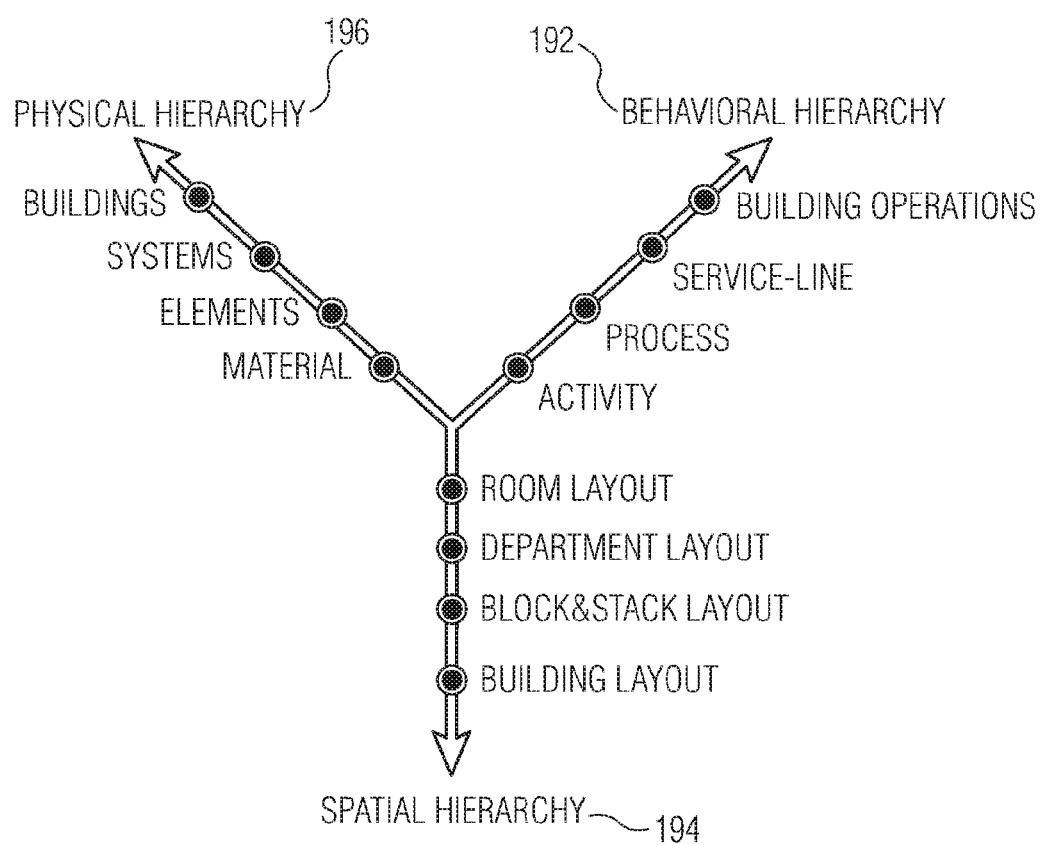
FIG. 11 illustrates an example of a unified data model that is used by the building realization platform.

In an embodiment, the process of going from a set of customer needs to a systems integration design is supported by a unified data model that is maintained by the BRP 102. FIG. 11 illustrates an example of a unified data model 190 that is used by the BRP in the design, modeling, simulation, optimization, and verification of a computer building system. As illustrated in FIG. 11, the unified data model includes a behavioral hierarchy 192, a spatial hierarchy 194, and a physical hierarchy 196.

In an embodiment, the behavioral hierarchy 192 defines the operational and business processes from single activities by individuals in dedicated rooms using specific equipment, to processes in departments, processes in service lines or business units to a building-wide operational model. The behavioral description can have various degrees of abstraction. For example, a department can be described as a single activity incurring costs and producing revenue, towards an activity handling patients, taking time, incurring costs and producing revenue, or an activity of staff handling patients, requiring specific equipment. Besides the human behavioral description, there can also be behavioral descriptions for non-human elements such as, for example, energy, light, and water. In FIG. 11, the behavioral hierarchy ranges from activity, to process, to service, to building operations, with each level in the behavioral hierarchy being more abstract than its predecessor.

In an embodiment, the spatial hierarchy 194 describes how the volume of a building is organized. For example, a building has stories, each story has departmental blocks and corridors, departmental blocks have rooms, hallways and circulation spaces, rooms contain furniture/fixtures/equipment (FFE) elements. Spatial descriptions can have various degrees of abstraction. For example, a building can be described from a vague buildable volume, a volume dictated by the site, physical constraints, legal constraints, and owner desires, towards the concept of an architectural parti describing a building configuration, e.g., an atrium versus a spine, towards a description of the major horizontal and vertical circulation areas, towards a global allocation of departments into various sections of the building, towards the exact location of every room and corridor in the building. In FIG. 11, the spatial hierarchy ranges from room layout, to department layout, to block and stack layout, to building layout, with each level in the spatial hierarchy being more abstract than its predecessor.

The physical hierarchy 196 describes how the physical building will be composed from a list of predefined building components. In FIG. 11, the physical hierarchy ranges from material, to elements, to systems, to buildings, with each level in the physical hierarchy being more abstract than its predecessor. For example, the building elements may include a set of predefined physical components such as interior walls, exterior walls, floor panels, roof panels, bathroom pods, aggregate equipment wall floor modules, equipment components and pods, utility frames, rebar cages for concrete structures, metal and concrete floor assemblies, structural steel, and utility systems. In an embodiment, certain aspects of the building components, such as dimensions, performance characteristics, aesthetic ratings, environmental concerns, cost, product life, etc., are known in advance and used as desired in the different domains of the BRP 102. As stated above, the use of predefined building components, each with known characteristics, allows for the development and reuse of mathematical models to design, model, simulate, optimize, and verify complex building systems.

For each of the data hierarchies and at each hierarchical level, there is both an abstract description and one or more structural descriptions. That is, within the unified data model, an object is described as consisting of a set of connected instances of objects of a lower level. For example, a process of a patient coming in for a regular exam could be described as a connected graph of individual activities involving different people and occurring at different locations. The unified data model may be used by the BRP in the design, simulation, optimization, and/or verification operations.

Figure 12:
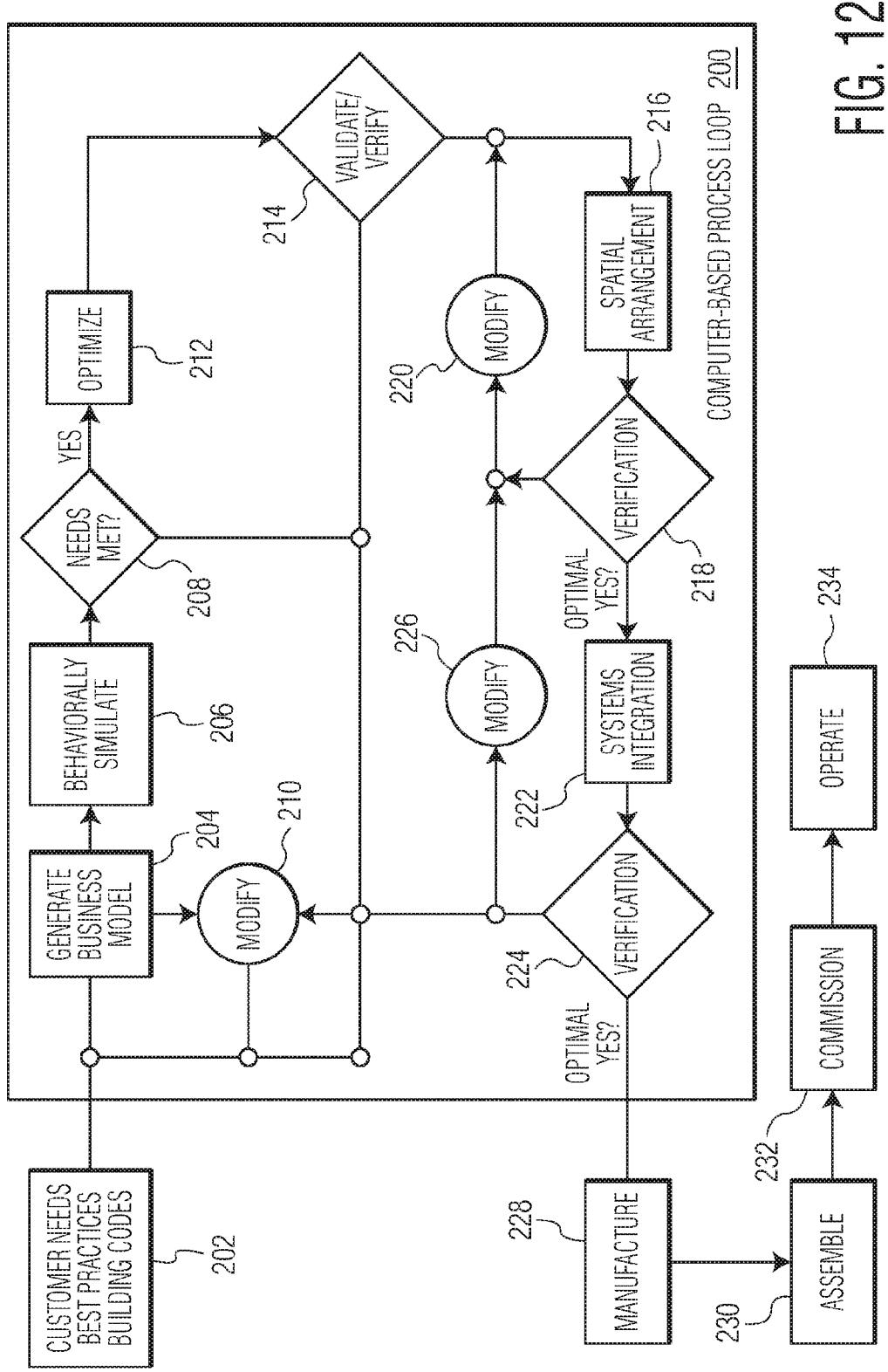
FIG. 12 is a process flow diagram of a computer-based technique for generating a systems integration design from a set of customer needs.

A parallel hierarchical design technique has been described with reference to FIGS. 1-11. As explained above, the parallel hierarchical design technique uses a centralized BRP 102 and an HP2 computing architecture 140 to process many different business models, spatial arrangements, and systems integration designs in parallel and in a hierarchical fashion that maintains design dependencies. An embodiment of a technique for generating a systems integration design from a set of customer needs is now described in more detail with reference to FIG. 12. In particular, FIG. 12 is a process flow diagram of a computer-based technique for generating a systems integration design from a set of customer needs. The technique utilizes a highly iterative computer-based process loop 200 that relies on computationally intensive simulation, optimization, and verification operations performed by HP2 computing resources to implement a design process that heretofore has not been envisioned and could not have been accomplished using a conventional PC-based computer system and conventional building design processes, including discipline-specific proprietary databases.

At block 202, customer needs are specified. For example, the customer needs are specified through a user interface that queries a user to input customer needs according to a specific functional description. Examples of information processed at the customer needs domain have been described above.

At block 202, additional information such as information related to best practices, including building and/or operational flow, and building codes may be entered as part of the customer needs. For example, there may be location-specific and/or customer-specific best practices and building codes that should be incorporated into the design from the building inception. The customer needs (including best practices and building codes) are stored in the database as described above.

At block 204, at least one business model is generated in response to the customer needs. In an embodiment, the business model specifies what services the building is to offer and at what volume the services are to be offered. In the case of a customer looking to provide acute healthcare services to the residents of a particular ZIP code, the business model may define the type and volume of acute healthcare services that should be provided to meet anticipated demand. At block 206, the behavior of one or more of the business models is simulated. In an embodiment, a behavioral simulation uses workflow modeling to simulate how the specified services could be provided. For example, a simulation could compare people and process workflow patterns with space patterns to determine how a proposed business model would perform. The results of the behavioral simulations can be output in the form of performance metrics, for example, as graphs or ratings of such parameters as patient wait times, machine utilization, number of staff required, staff utilization, space utilization, energy efficiency, etc. Various different parameters can be used to evaluate the desirability of business models based on the behavioral simulation.

At block 208, the results of the behavioral simulations can be evaluated to see if the customer needs have been met. This can be a manual process, which includes direct human interaction, an automatic process (no human interaction), which is based on preprogrammed criteria, or a combination thereof. At block 210, it is also possible to modify the customer needs and/or the business model. A modification of the customer needs and or business model can be propagated downstream in the flow, including for example, the behavioral simulation.

At block 212, once the behavioral simulation has shown that a particular business model meets the customer needs, the business model can be put through a computer-based optimization process. For example, the computer-based optimization process can run through a large number of design alternatives to optimize certain aspects of the building design. In an embodiment, an optimization process attempts to optimize areas of importance that are specified in the customer needs. For example, if the customer needs place a high value on worker convenience, then designs that minimize worker walking distances may be favored. Likewise, if the customer needs place a high value on energy efficiency, then designs that minimize the need for artificial light and HVAC may be favored. Other criteria for optimization may include Return on Investment (ROI), capital expense operating expense, patient wait time, or any combination thereof.

In a complex building system such a hospital, the customer needs will specify a wide range of design priorities that can only be optimized through a multidimensional analysis of a large number of design variables. The multidimensional analysis of a large number of design variables is computationally processed by the HP2 computing resources as described with reference to FIG. 2.

Once a business model has been optimized, at block 214, the optimized business model is put through a validation process. The validation process checks to see if a particular business model meets particular design rules (e.g., design rule checking) and/or to see if the business module meets the specified customer needs. The process of generating a new business model (or modifying an already existing business model), behaviorally simulating the new business model, optimizing the new business model, and validating the new business model, can be run through multiple iterations before the design moves to the spatial arrangement domain.

At block 216, each validated business model can be used as input to generate one or more spatial arrangements. As described above, a spatial arrangement may specify the form and shell of a building system, the block and stack arrangement of the building system, and the room placement. The spatial arrangement may be simulated and/or optimized as described using the HP2 computing resources. At blocks 218 and 220, the spatial arrangement can be processed through an iterative process of verification and modification. For example, the verification operation may involve design rule checking and the modification may involve adjusting one or more parameters of the spatial arrangement.

At block 222, each verified spatial arrangement can be used as input to generate one or more systems integration designs. As described above, the systems integration design may specify the 3D spaces and infrastructure of the building system. In the systems integration domain, the systems integration design may be simulated and optimized as desired using the HP2 computing resources. At blocks 224 and 226, the spatial integration design can be processed through an iterative process of verification and modification. For example, the verification operation may involve design rule checking and the modification may involve adjusting one or more parameters of the systems integration design. The output of the systems integration design can be used to implement operations in the manufacturing, assembly, commissioning, and operation domains as represented by blocks 228, 230, 232, and 234, respectively.

Figure 13:
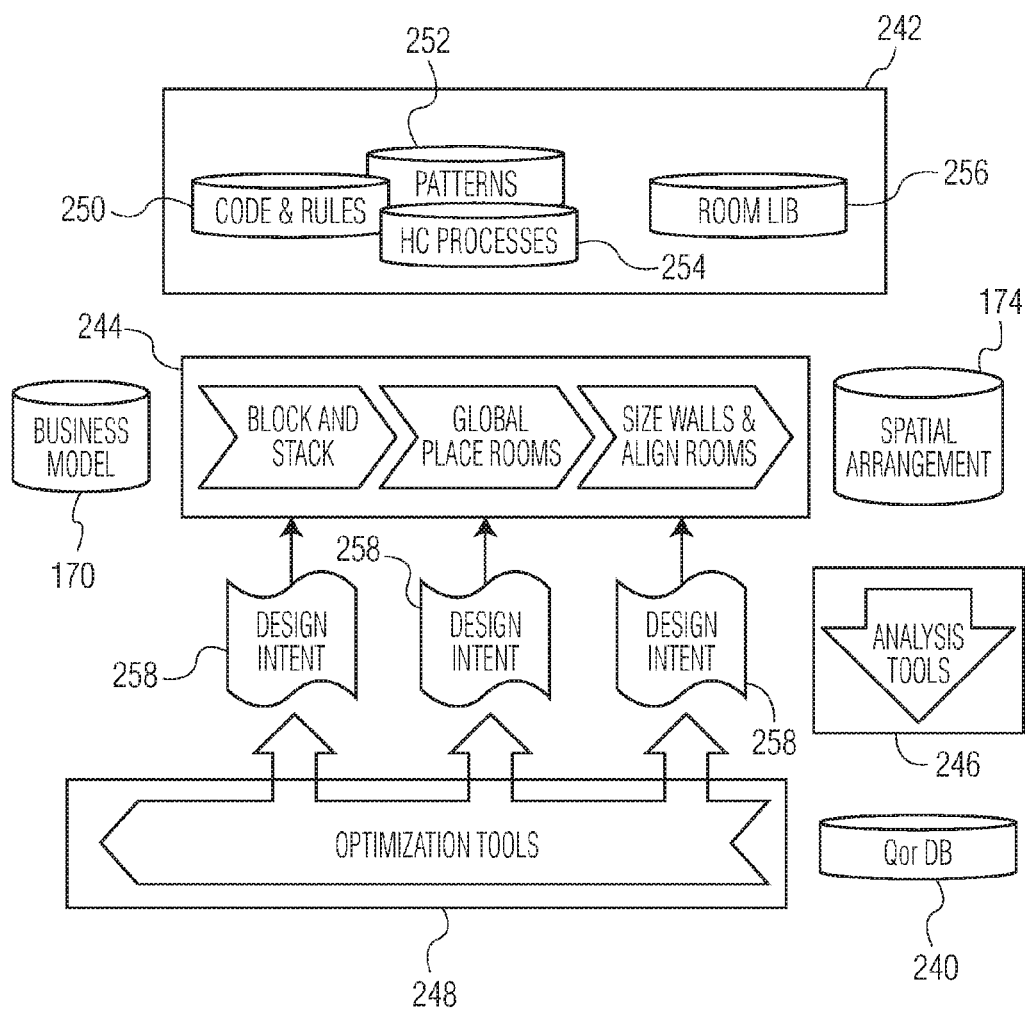
FIG. 13 illustrates system elements and a corresponding process flow for generating a spatial arrangement from a business model using the building realization platform.

FIG. 13 illustrates system elements and a corresponding process flow for generating a spatial arrangement from a business model using the BRP 102. The system elements include at least one of the business model databases 170, at least one of the spatial arrangement databases 174, an analysis database 240, a building design knowledge base 242, synthesis tools 244, analysis tools 246 (e.g., simulation and/or validation), and optimization tools 248. In the building design knowledge base, a codes and rules element 250 includes building codes and building design rules, a patterns element 252 includes a pre-established set of design patterns (e.g., architectural patterns or architectural partis), a healthcare (HC) processes element 254 includes healthcare process workflow rules, and a rooms library 256 includes a pre-established set of rooms that have certain physical and/or operational characteristics. In operation, the information from the business model is processed by the synthesis tools to generate one or more spatial arrangements. The synthesis tools use information from the building design knowledge base and design intent 258 (e.g., design criteria) to generate a spatial arrangement. The spatial arrangement can then be analyzed (e.g., simulated and/or validated) as desired and the results of the analysis are stored in the analysis database. The optimization tool can be used to change parameters of the design intent (e.g., the orientation of the building (see FIG. 7) or the number of rooms per wing or the nurse ratio (see FIG. 9)), which are then propagated through the synthesis tools to generate optimized spatial arrangements.

Although the BRP 102 has been described above in the context of a healthcare building such as a hospital, the above described BRP and associated techniques are applicable to other buildings and building systems. For example, the BRP and associated techniques may be applicable to hospitality buildings (e.g., hotels), apartment/condominium buildings, and transportation facilities (e.g., airports). Additionally, a building system may include one or more buildings that can be detached from each other, partially attached to each other, or fully attached to each other. For example, a building system may be a building or a set of buildings that are located at the same physical site/location and that are intended to fulfill a set of customer needs.

Figure 14:
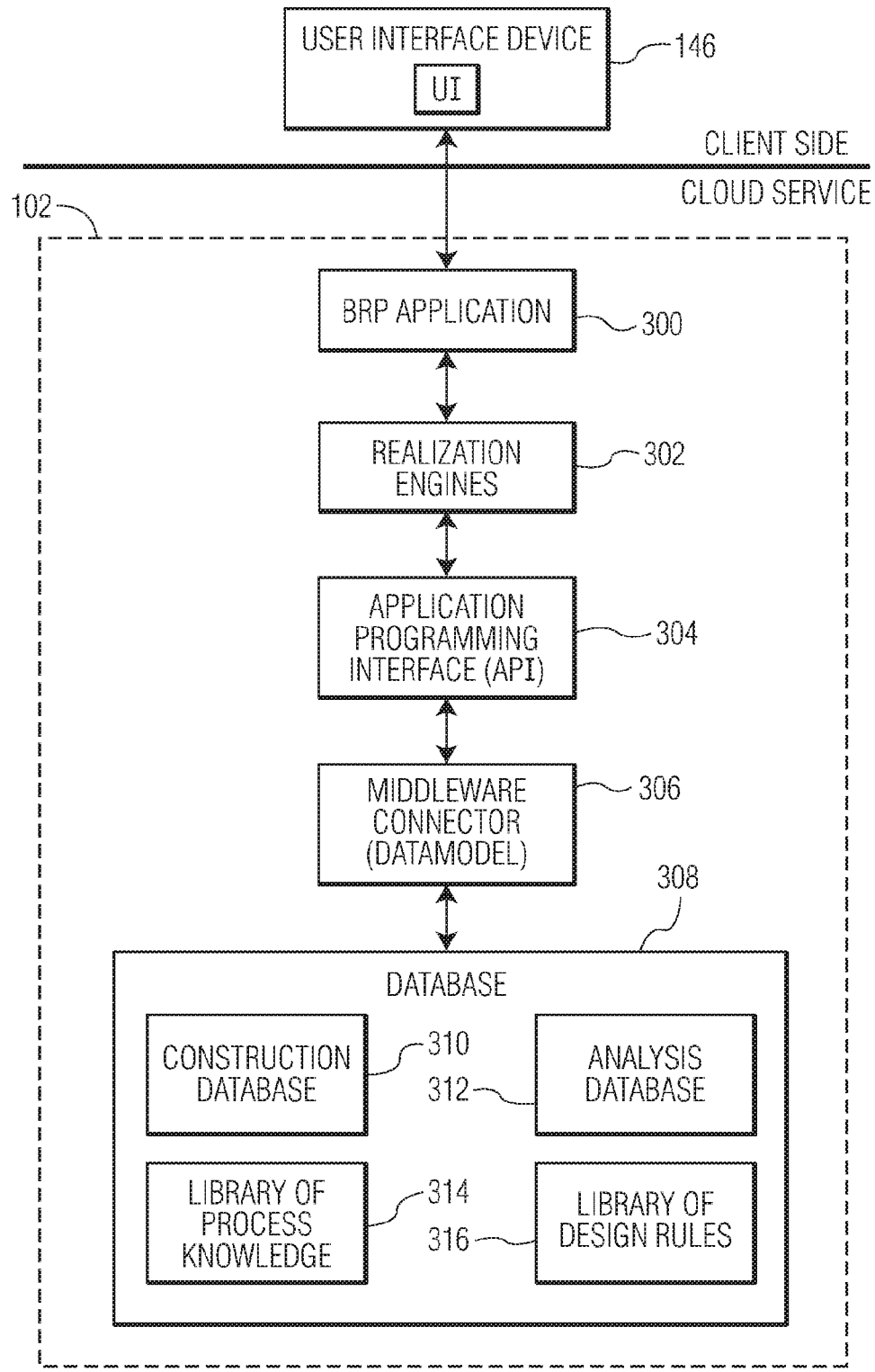
FIG. 14 illustrates an embodiment of the architecture of an embodiment of the building realization platform.

FIG. 14 illustrates an embodiment of the architecture of an embodiment of the BRP relative to a user interface device 146 on a client side of a network and a cloud service from which the BRP 102 is implemented. As depicted in FIG. 14, the BRP includes a BRP application 300, realization engines 302, an application programming interface (API) 304, a middleware connector 306, and a database 308. In an embodiment, the realization engines provide the design, modeling, simulation, optimization, and verification services of the BRP and the BRP application provides the logic that allows the user of the client device to communicate with and control, via a user interface, the services that are provided by the realization engines. The API provides the logic to enable the realization engines to obtain data from and provide data to the database. The middleware connector provides an abstraction layer between the realization engines and the database. The database stores data related to the design, modeling, simulation, optimization, and verification of building systems. In the embodiment of FIG. 14, the database includes a construction database 310, an analysis database 312, a library of process knowledge 314, and a library of design rules 316 although the data in the database can be organized in other ways. In an embodiment, the computer readable instructions necessary to implement the BRP application, the realization engines, the API, and the middleware connector and the data in the database are stored in servers of the cloud service. When called upon for execution, the instructions and corresponding data are processed by processors of the cloud service as described above.

Figure 15:
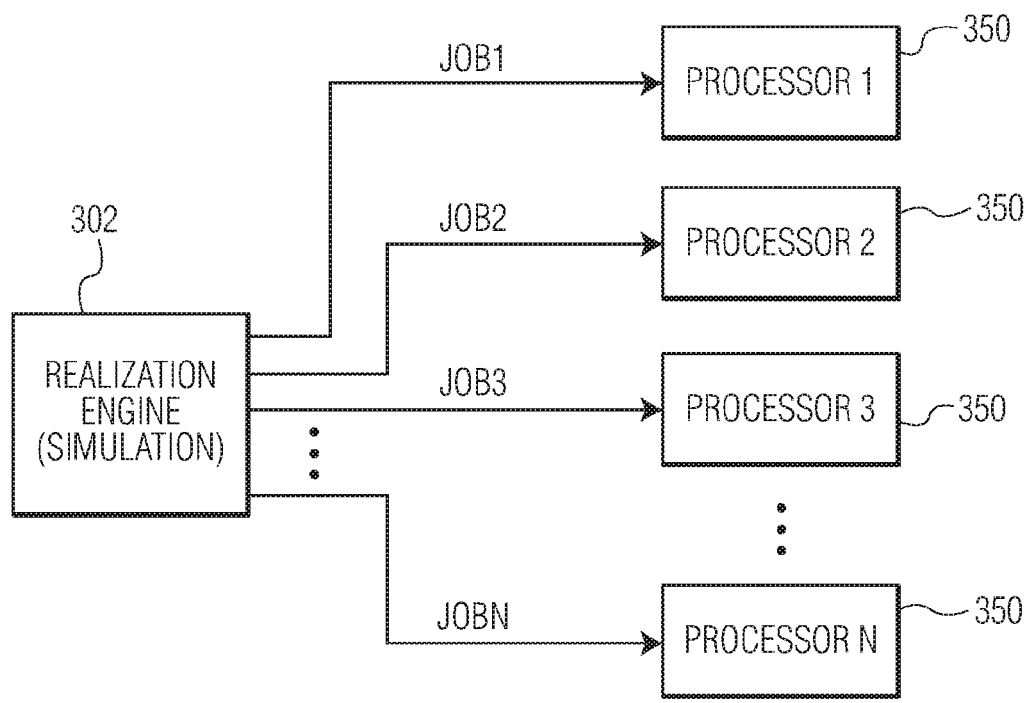
FIG. 15 illustrates the execution of a service that is provided by one of the realization engines.

FIG. 15 illustrates the execution of a service that is provided by one of the realization engines 302. For example, the service is a simulation that involves distributing a set of computational tasks amongst a large number of physically distinct processors or separate processing cores. As shown in FIG. 15, N different computational tasks related to the same simulation operation are distributed amongst N different processors 350, where N is, for example, in the range of 100-1,000. As described above, the processors may be provided through a cloud service and used only on an as needed basis.

In an embodiment, the BRP 102 allows the generation and optimization of a virtual building based on user needs and a comprehensive set of rules including building codes and best practices in the corresponding industries. Users create virtual buildings using a design flow that morphs the design gradually from a very abstract description (for example, serve an area defined by a set of ZIP codes with enough acute care capacity to satisfy demand) to a fully detailed description containing architectural intent, engineering details, and construction details that leave no ambiguity as to how the building should be built and how the building system will perform. Once a virtual building is complete within the BRP, detailed operation and construction documents can be generated by the BRP in various industry standard formats. In an embodiment, a virtual building system maintained by the BRP contains detailed information about the building and all its subsystems, and about its use and its performance along many dimensions such as operating costs, construction costs, thermal comfort level, daylight usage, sustainability, operational efficiency, patient experience. The virtual building system maintained by the BRP is detailed and accurate enough that it can be used to unambiguously generate detailed construction documents for the construction of a real building system having a performance that matches the performance of the virtual building system.

In an embodiment, the virtual building system that is maintained by the BRP can be used to predict the implications of changes during the lifetime of the building. In an embodiment, the virtual building system includes descriptions of: the building structure; the processes and service lines, the mechanical, electrical, plumbing (MEP) subsystems; the information technology (IT) subsystem; the thermal/energy behavior; the seismic behavior; the light behavior; and the sound behavior. In an embodiment, the virtual building system maintained in the BRP differs from current practices in the following ways: Besides the description of the physical building, the virtual building system also includes the description of the purpose and operation of the building as both the building and the processes need to be designed and measured together. The information about the building is partitioned differently. Traditionally, information is grouped per domain (building structure, mechanical system, electrical system) with a loose coupling between various domains. This is done because the toolsets for the different domains differ and because the domain-specific information resides with different companies. Here, information of all domains is grouped by sequence in which design decisions are made and information becomes available. Unlike current building information modeling (BIM) practices, where the overall architecture is a federated network of isolated systems, each holding a part of the golden design information and exchanging a minimum information with each other using standard protocols on a need basis, the approach described herein is a star configuration where different systems communicate exclusively through the BRP. The golden design information resides in a central database and the satellite systems are used as agents that change the central golden information and report back.

Figure 16:
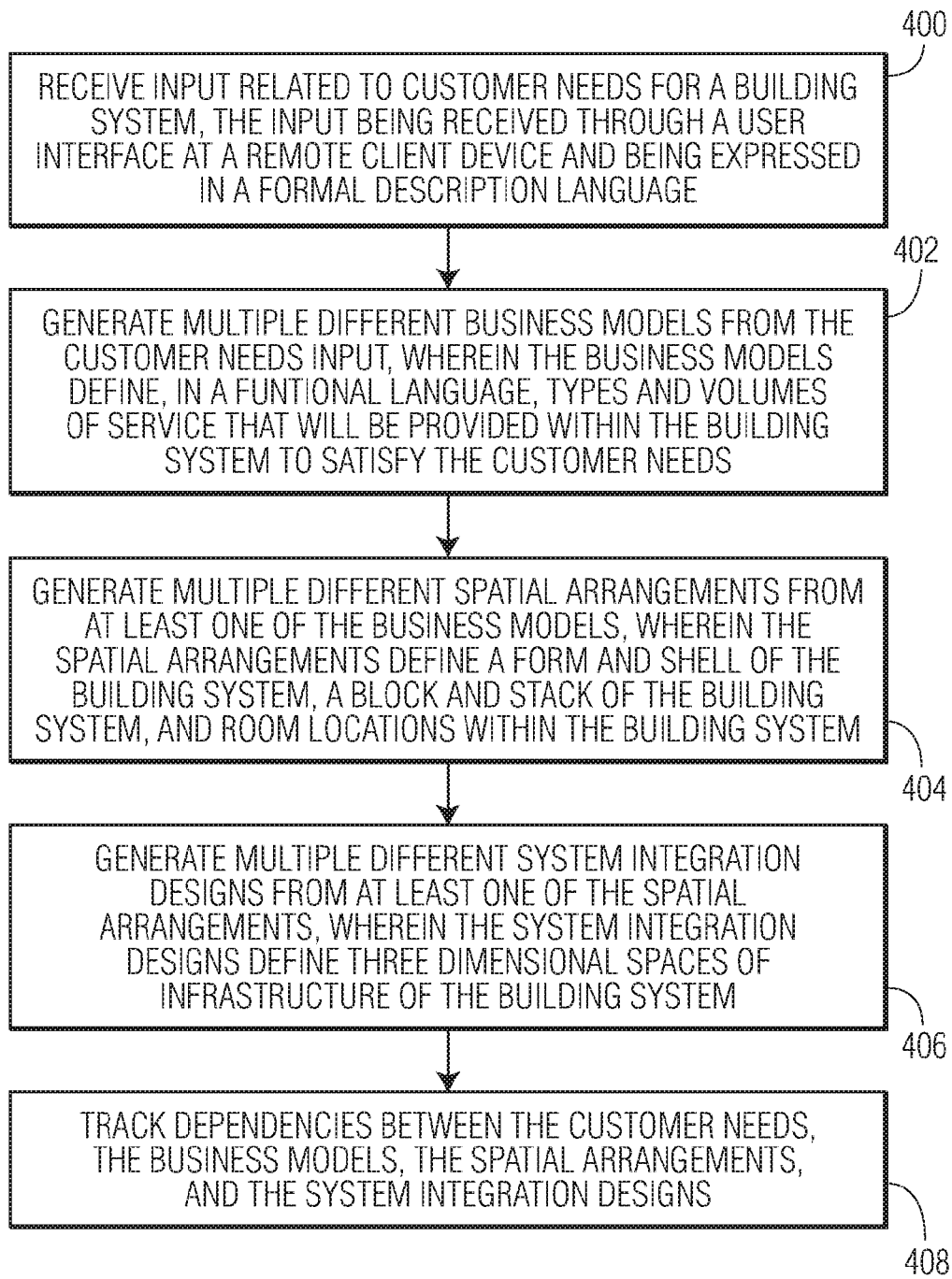
FIG. 16 is a process flow diagram of a method for realizing a complex building system.

FIG. 16 is a process flow diagram of a method for realizing a complex building system. At block 400, input related to customer needs for a building system is received, the input being received through a user interface at a remote client device and being expressed in a formal description language. At block 402, multiple different business models are generated from the customer needs input, wherein the business models define, in a functional language, types and volumes of services that will be provided within the building system to satisfy the customer needs. At block 404, multiple different spatial arrangements are generated from at least one of the business models, wherein the spatial arrangements define a form and shell of the building system, a block and stack of the building system, and room locations within the building system. At block 406, multiple different systems integration designs are generated from at least one of the spatial arrangements, wherein the systems integration designs define three dimensional spaces of infrastructure of the building system. At block 408, dependencies are tracked between the customer needs, the business models, the spatial arrangements, and the systems integration designs.

Figure 17:
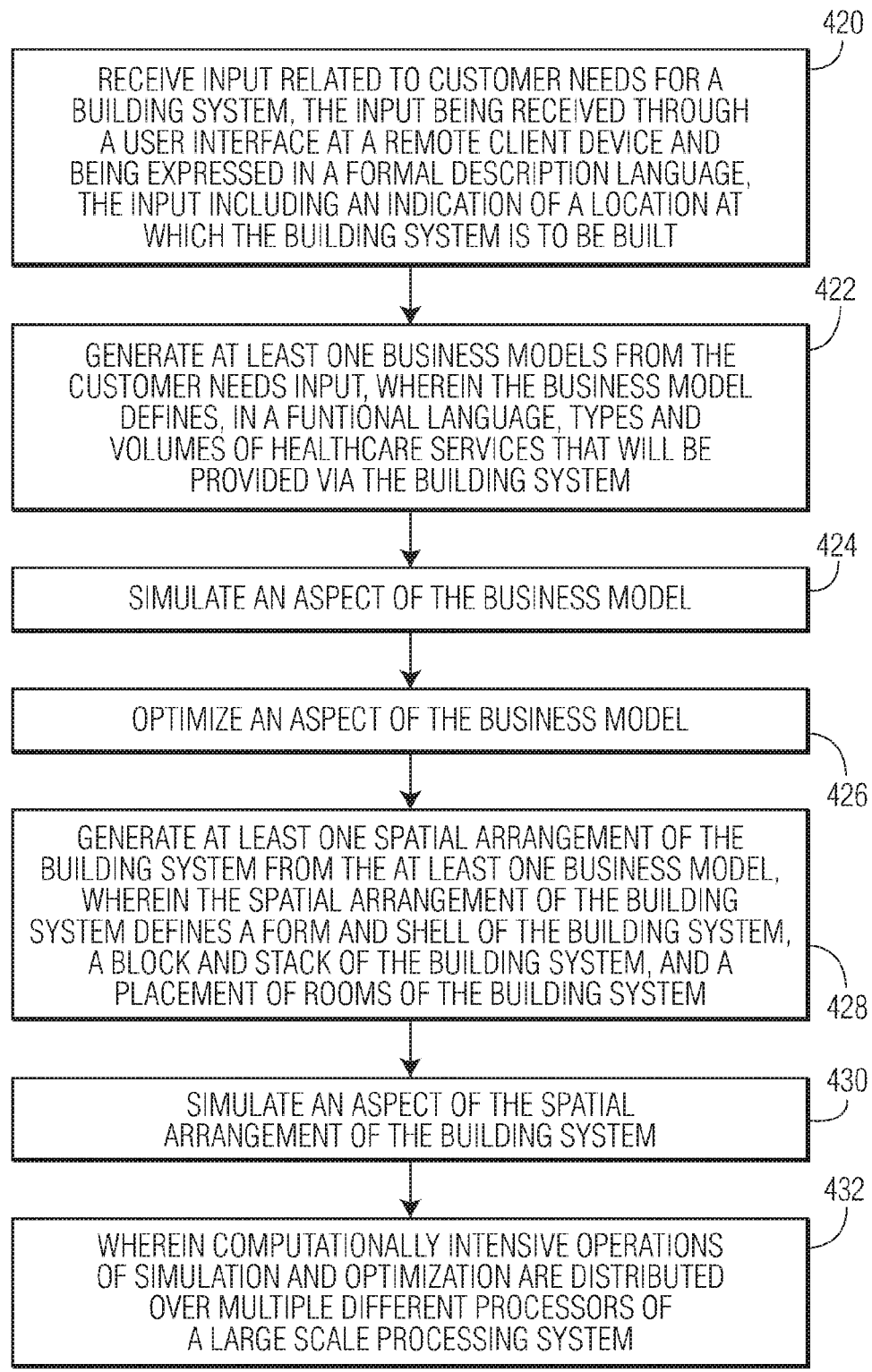
FIG. 17 is a process flow diagram of a method for realizing a building system within which healthcare services will be provided to patients.

FIG. 17 is a process flow diagram of a method for realizing a building system within which healthcare services will be provided to patients. At block 420, input related to customer needs for a building system is received, the input being received through a user interface at a remote client device and being expressed in a formal description language, the input including an indication of a location at which the building system is to be built. At block 422, at least one business model is generated from the customer needs input, wherein the business model defines, in a functional language, types and volumes of healthcare services that will be provided via the building system. At block 424, an aspect of the business model is simulated. At block 426, an aspect of the business model is optimized. At block 428, at least one spatial arrangement of the building system is generated from the at least one business model, wherein the spatial arrangement of the building system defines a form and shell of the building system, a block and stack of the building system, and a placement of rooms of the building system. At block 430, an aspect of the spatial arrangement of the building system is simulated. At block 432, the computationally intensive operations of simulation and optimization are distributed over multiple different processors of a large scale processing system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 18:
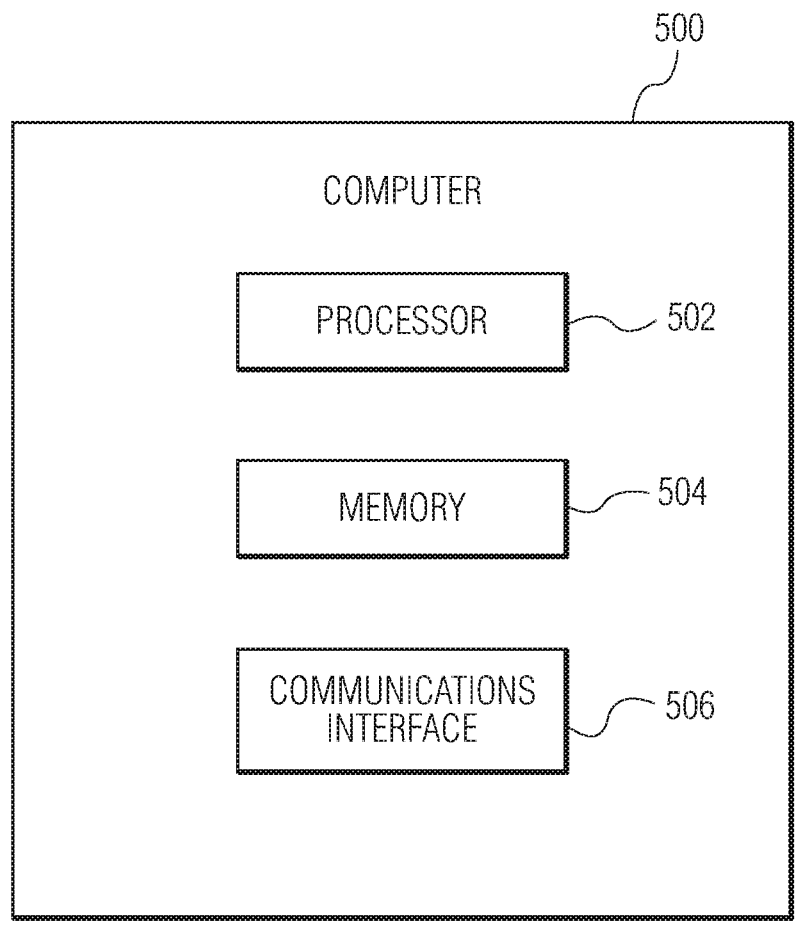
FIG. 18 depicts a computer that includes a processor, memory, and a communications interface.

In an embodiment, the above-described functionality is performed by a computer or computers, which executes computer readable instructions. FIG. 18 depicts a computer 500 that includes a processor 502, memory 504, and a communications interface 506. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer based method for realizing a building system within which healthcare services will be provided to patients, the method comprising:

receiving input related to customer needs for a building system, which includes at least one building within which healthcare services will be provided to patients, the input being received through a user interface at a remote client device and being expressed in a formal description language;

generating multiple different business models from the customer needs input, wherein the business models define, in a functional language, types and volumes of healthcare services that will be provided within the at least one building of the building system to satisfy the customer needs, wherein generating multiple different business models comprises performing a computer based simulation operation that involves comparing people and process workflow patterns within the at least one building with space patterns within the at least one building to determine how the business models would perform in terms of at least one of patient wait times, machine utilization, number of staff required, staff utilization, space utilization, and energy efficiency, wherein the computer based simulation operation is performed utilizing a pre-defined set of physical building components that includes at least the dimensions of a deck component;

generating multiple different spatial arrangements from at least one of the business models, wherein the spatial arrangements define a form and shell of the building system, a block and stack of the building system, and room locations within the building system;

generating multiple different systems integration designs from at least one of the spatial arrangements, wherein the systems integration designs define three dimensional spaces of infrastructure of the building system;

tracking dependencies between the customer needs, the business models, the spatial arrangements, and the systems integration designs, wherein tracking dependencies between the customer needs, the business models, the spatial arrangements, and the systems integration designs comprises storing instance-specific data for the customer needs, for each of the multiple different business models, for each of the different spatial arrangements, and for each of the different system integrations, in a central database and in hierarchical order from the customer needs at the highest level to the business models to the spatial arrangements to the system integrations such that each system integration design tracks back to the customer needs via a corresponding spatial arrangement and a corresponding business model and propagating changes in the customer needs, the business models, and the spatial arrangements in hierarchical order.

2. The computer based method of claim 1 wherein central database is stored in a cloud service.

3. The computer based method of claim 1 further comprising distributing computational tasks of the computer based simulation operation over multiple different processors of a cloud service that includes a large scale processing system.

4. The computer based method of claim 3 wherein the computational tasks are performed by the large scale processing system according to a MapReduce framework.

5. The computer based method of claim 1 wherein the input related to customer needs includes a formal description of customer values.

6. The computer based method of claim 5 wherein the business models are generated from a library of business model design rules.

7. The computer based method of claim 6 further comprising computing behavioral simulations on the different business models using multiple different processors that are accessed in parallel via a cloud service that includes a large scale processing system.

8. The computer based method of claim 1 wherein the business models identify:
at least one of service lines and departments that are to be provided by the building system;
patient load on the building system; and
room and staff needs.

9. The computer based method of claim 8 wherein the business models identify service lines, and wherein the service lines include at least one of emergency care, well care, imaging, and laboratory.

10. The computer based method of claim 1 wherein each instance of the business models and the spatial arrangements is uniquely stored in the central database so that each instance can be independently accessed and modified.

11. A computer based method for realizing a building system within which healthcare services will be provided to patients, the method comprising:
receiving input related to customer needs for a building system, which includes at least one building within which healthcare services will be provided to patients, the input being received through a user interface at a remote client device and being expressed in a formal description language, the input including an indication of a location at which the building system is to be built;
generating at least one business model from the customer needs input, wherein the business model defines, in a functional language, types and volumes of healthcare services that will be provided within the at least one building of the building system;
simulating an aspect of the business model, wherein simulating an aspect of the business model comprises performing a computer based simulation operation that involves comparing people and process workflow patterns within the at least one building with space patterns within the at least one building to determine how the business model would perform in terms of at least one of patient wait times, machine utilization, number of staff required, staff utilization, space utilization, and energy efficiency, wherein the computer based simulation operation is performed utilizing a pre-defined set of physical building components that includes at least the dimensions of a deck component;
optimizing an aspect of the business model;
generating at least one spatial arrangement of the building system from the at least one business model, wherein the spatial arrangement of the building system defines a form and shell of the building system, a block and stack of the building system, and a placement of rooms of the building system; and
simulating an aspect of the spatial arrangement of the building system;
wherein computational tasks of the simulation and optimization operations are distributed over multiple different processors of a large scale processing system;
wherein:
simulating an aspect of the business model comprises using a pre-defined set of physical building components that includes at least the dimensions of a deck component;
optimizing an aspect of the business model comprises using the pre-defined set of physical building components that includes at least the dimensions of a deck component;
generating at least one spatial arrangement of the building system comprises using the pre-defined set of physical building components that includes at least the dimensions of a deck component; and
simulating an aspect of the spatial arrangement comprises using the pre-defined set of physical building components that includes at least the dimensions of a deck component;
tracking dependencies between the customer needs, the business model, and the spatial arrangement, wherein tracking dependencies between the customer needs, the business models, and the spatial arrangements comprises storing instance-specific data for the customer needs, for each of the multiple different business models, and for each of the different spatial arrangements in a central database and in hierarchical order from the customer needs at the highest level to the business models to the spatial arrangements such that each spatial arrangement tracks back to the customer needs via a corresponding business model and propagating changes in the customer needs, the business models, and the spatial arrangements in hierarchical order.

12. The computer based method of claim 11 wherein the computational tasks are performed by the large scale processing system according to a MapReduce framework.

13. A system comprising:
a large scale processing system having multiple different instruction processors;
a storage network, in communication with the large scale processing system, which stores computer readable instructions and data, which when processed by the large scale processing system implement a building realization platform;
the building realization platform being configured to:
receive input related to customer needs for a building system, which includes at least one building within which healthcare services will be provided to patients, the input being received through a user interface at a remote client device and being expressed in a formal description language, the input including an indication of a location at which the building system is to be built;
generate at least one business model from the customer needs input, wherein the business model defines, in a functional language, types and volumes of healthcare services that will be provided within the at least one building of the building system;

simulate an aspect of the business model, wherein simulating an aspect of the business model comprises performing a computer based simulation operation that involves comparing people and process workflow patterns within the at least one building with space patterns within the at least one building to determine how the business model would perform in terms of at least one of patient wait times, machine utilization, number of staff required, staff utilization, space utilization, and energy efficiency, wherein the computer based simulation operation is performed utilizing a pre-defined set of physical building components that includes at least the dimensions of a deck component;

optimize an aspect of the business model;

generate at least one spatial arrangement of the building system from the at least one business model, wherein the spatial arrangement of the building system defines a form and shell of the building system, a block and stack of the building system, and a placement of rooms of the building system; and simulate an aspect of the spatial arrangement of the building system; and track dependencies between the customer needs, the business model, and the spatial arrangement, wherein tracking dependencies between the customer needs, the business models, and the spatial arrangements comprises storing instance-specific data for the customer needs, for each of the multiple different business models, and for each of the different spatial arrangements in a central database and in hierarchical order from the customer needs at the highest level to the business models to the spatial arrangements such that each spatial arrangement tracks back to the customer needs via a corresponding business model and propagating changes in the customer needs, the business models, and the spatial arrangements in hierarchical order;

wherein computational tasks of the simulation and optimization operations are distributed over multiple different processors of the large scale processing system.

14. The system of claim 13 wherein the large scale processing system and the storage network are elements of a cloud service.

15. The system of claim 14 wherein the building realization platform is further configured to distribute the computational operations of simulation and optimization over multiple different processors of the large scale processing system using a MapReduce framework.

16. A system comprising:
a large scale processing system having multiple different instruction processors;
a storage network, in communication with the large scale processing system, which stores computer readable instructions and data, which when executed by the large scale processing system implement a building realization platform;
the building realization platform comprising:
a customer needs domain configured to store, in a formal description language, an indication of a location at which a building system, which includes at least one building within which healthcare services will be provided to patients, is to be built;
a business model domain configured to store information that specifies types and volumes of healthcare services to be provided within the at least one building of the building system in response to criteria from the customer needs domain, wherein generating multiple different business models comprises performing a computer based simulation operation that involves comparing people and process workflow patterns within the at least one building with space patterns within the at least one building to determine how the business models would perform in terms of at least one of patient wait times, machine utilization, number of staff required, staff utilization, space utilization, and energy efficiency, wherein the computer based simulation operation is performed utilizing a pre-defined set of physical building components that includes at least the dimensions of a deck component;
a spatial arrangement domain configured to generate and store at least one spatial arrangement of the building system in response to criteria from the business model domain, wherein the spatial arrangement of the building system defines a form and shell of the building system, a block and stack of the building system, and a placement of rooms of the building system;
a systems integration domain configured to generate and store at least one systems integration design in response to criteria from the spatial arrangement domain, wherein the systems integration design defines three dimensional spaces of infrastructure of the building;
a fabrication domain that generates a list of building components that are required to build the building system as specified in the systems integration design; and
an operation domain configured to generate and store a virtual model of the building system in response to information from the customer needs domain, the business model domain, the spatial arrangement domain, and the systems integration domain, and further configured to model, simulate, or optimize an operational parameter of a built version of the building system.

17. The system of claim 16 further comprising tracking dependencies between the customer needs, the business model, and the spatial arrangement.

18. The system of claim 17 wherein the business model domain and the spatial arrangement domain are configured to perform at least one of a computer based simulation operation and a computer based optimization operation.

19. The system of claim 18 wherein the computational tasks of the simulation and optimization operations are distributed over multiple different processors of the large scale processing system.

20. The system of claim 19 wherein the computational tasks of the simulation and optimization operations are performed in parallel according to a MapReduce framework.

* * * * *